United States Patent [19]
Feller

[11] Patent Number: 5,691,484
[45] Date of Patent: Nov. 25, 1997

[54] MAGNETIC FLOW SENSOR

[76] Inventor: Murray F. Feller, Rte. 2, Box 562A, Micanopy, Fla. 32667

[21] Appl. No.: 681,765

[22] Filed: Jul. 29, 1996

Related U.S. Application Data

[63] Continuation-in-part of Ser. No. 429,534, Apr. 26, 1995, abandoned.

[51] Int. Cl.$^6$ .................................................. G01F 1/58
[52] U.S. Cl. ........................................ 73/861.13; 73/861.15
[58] Field of Search .......................... 73/861.08, 861.12, 73/861.13, 861.14, 861.15, 861.16, 861.17

[56] References Cited

U.S. PATENT DOCUMENTS

| | | | |
|---|---|---|---|
| 3,777,561 | 12/1973 | Lewis | 73/861.13 |
| 3,802,262 | 4/1974 | Banks . | |
| 3,897,684 | 8/1975 | Dewan . | |
| 3,903,741 | 9/1975 | Greene | 73/861.13 |
| 3,967,500 | 7/1976 | Forster | 73/861.08 |
| 4,195,515 | 4/1980 | Smoll | 73/861.15 |
| 4,825,703 | 5/1989 | Kubota | 73/861.12 |

*Primary Examiner*—Elizabeth L. Dougherty
*Assistant Examiner*—Max H. Noori
*Attorney, Agent, or Firm*—Harness, Dickey & Pierce

[57] ABSTRACT

Sensors for measuring the flow rate of fluids flowing through a chamber. The chamber is formed using electrically insulating material through which there is an orthogonal alternating magnetic field provided by a mechanically repositioned permanent magnet and at least a pair of electrodes in line with and orthogonal to the magnetic field. This provides an electrical potential with a magnitude proportional to flow rate. The alternating magnetic field may also be provided by a stationary multiple electromagnet. Various embodiments are disclosed which make use of electromagnetics, stepper motors and other modifications for adapting the flow sensor to a wide variety of applications and environmental conditions.

13 Claims, 16 Drawing Sheets

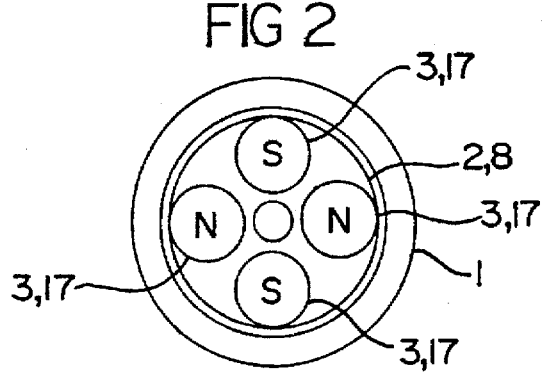
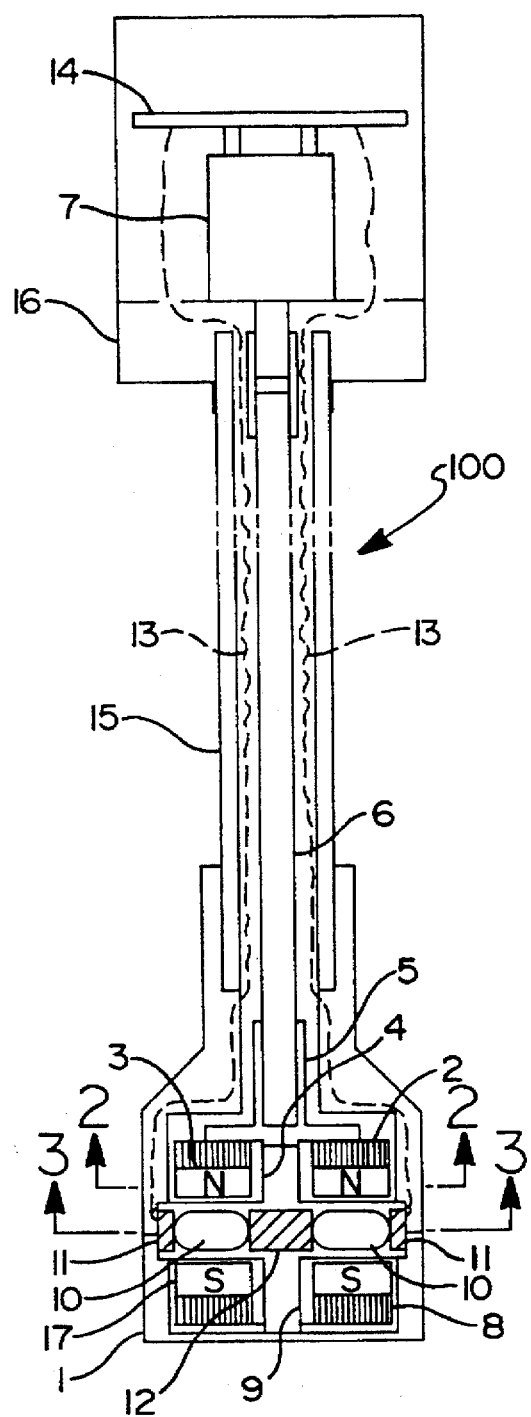
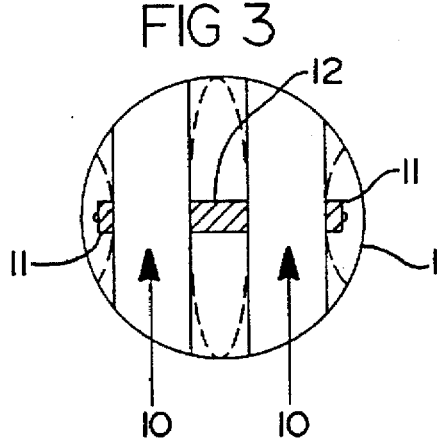
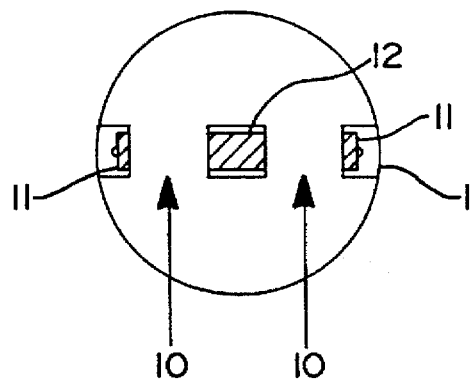

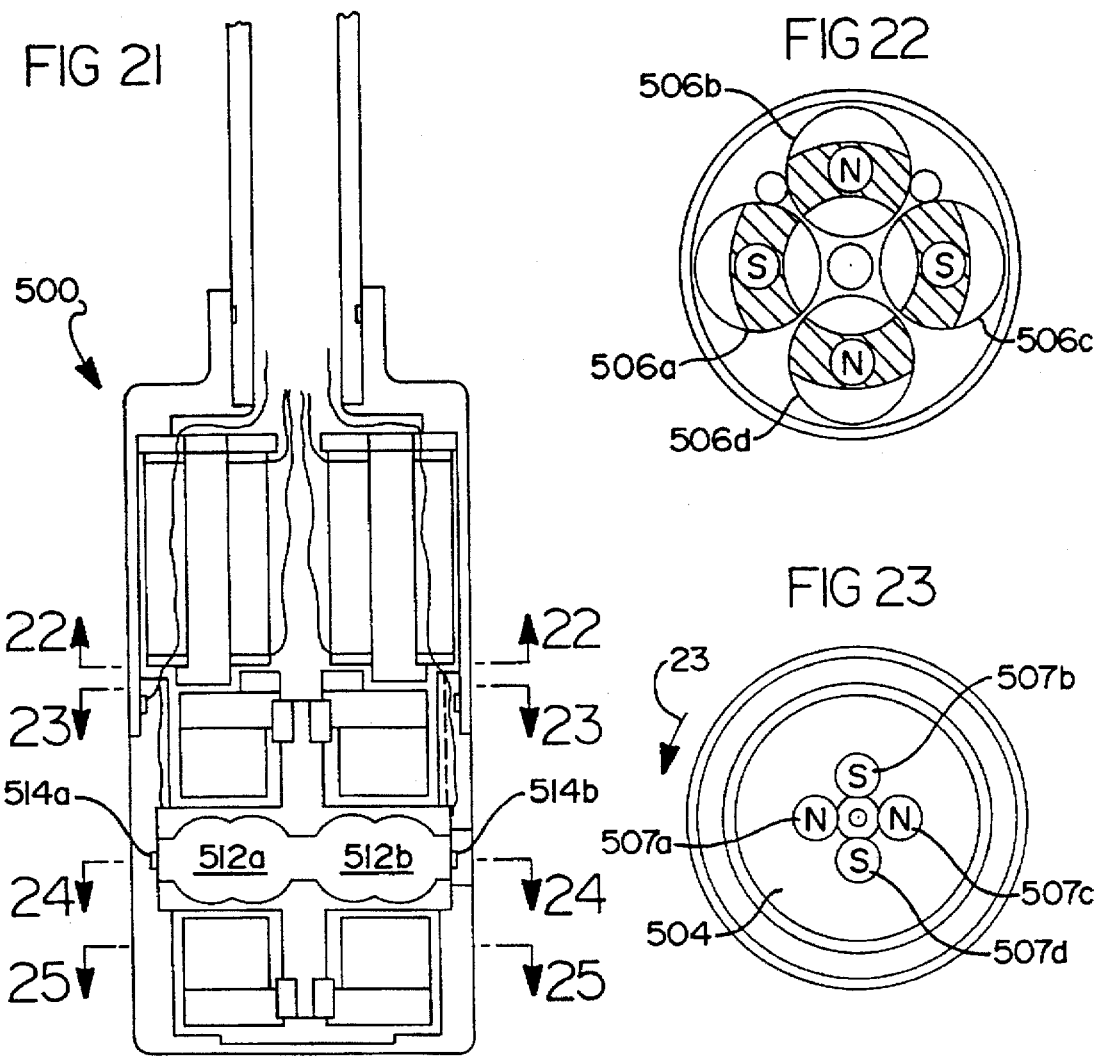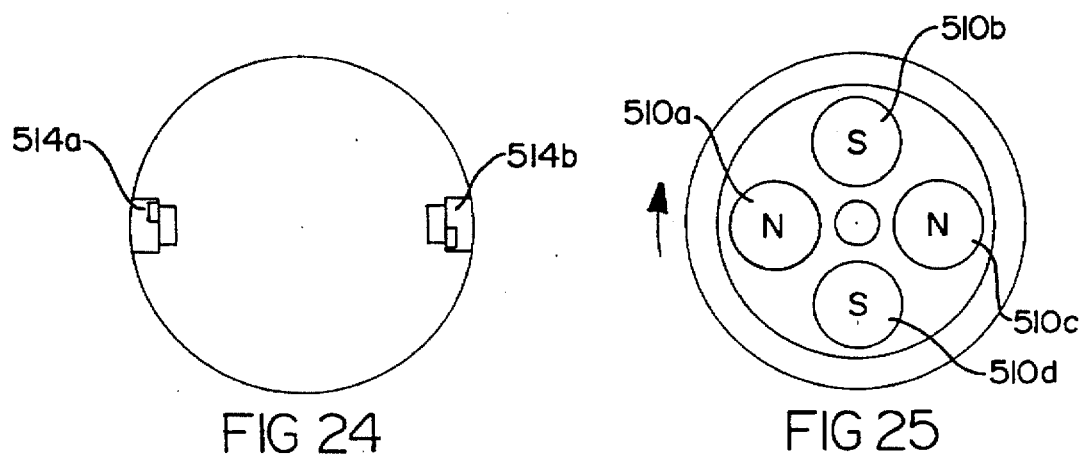

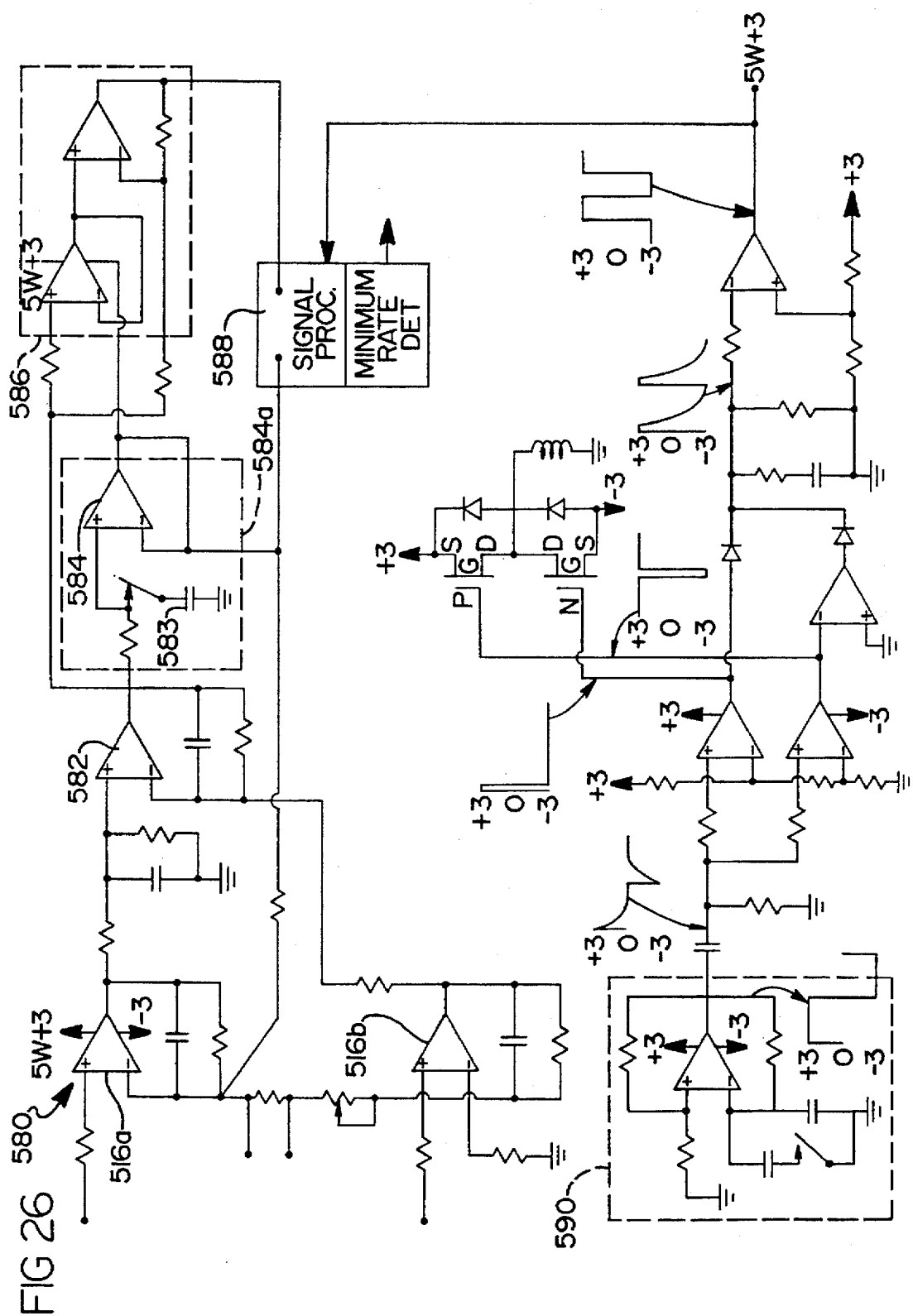

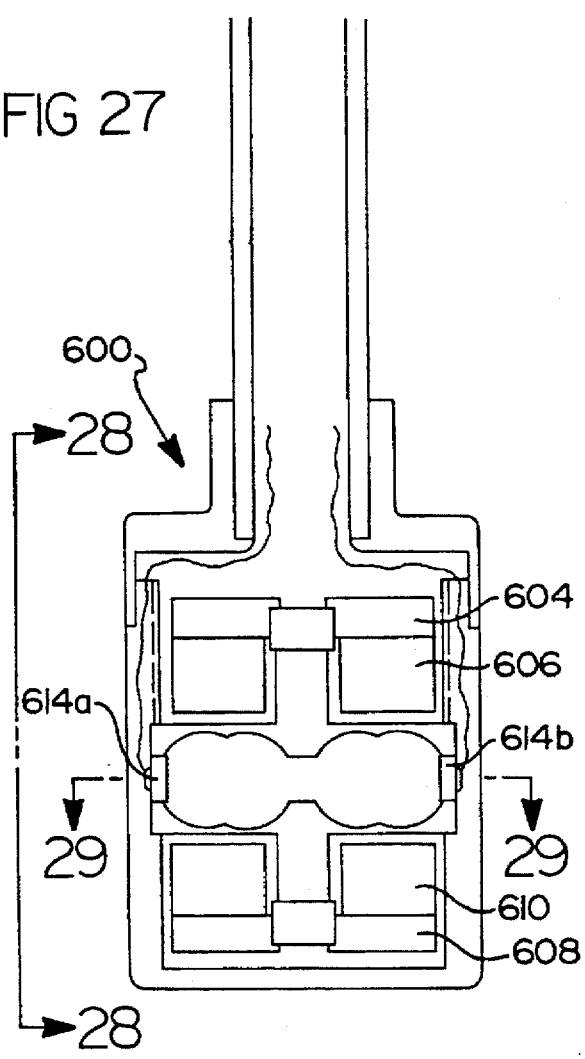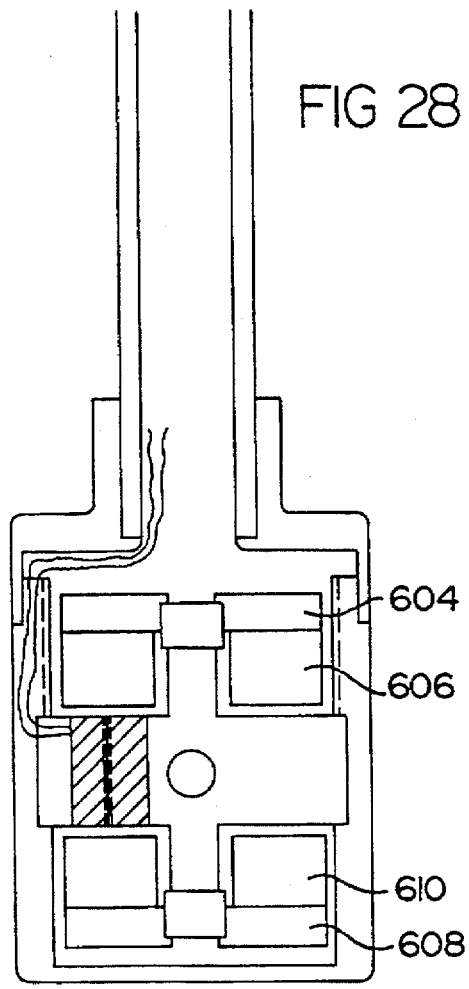

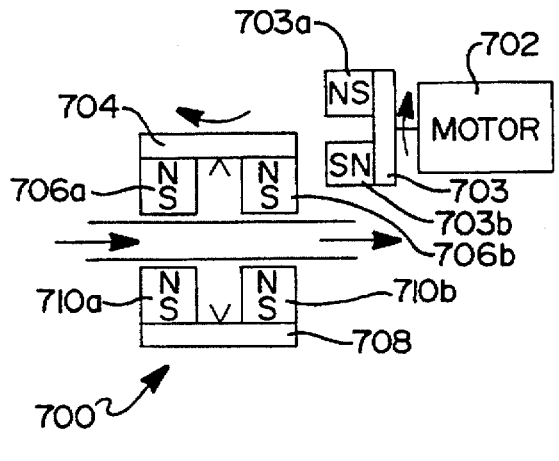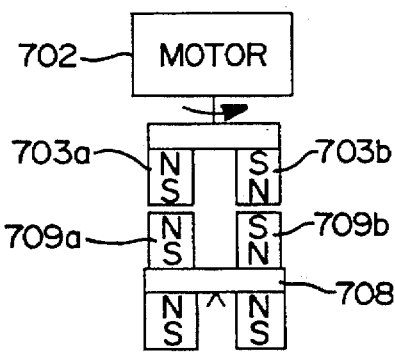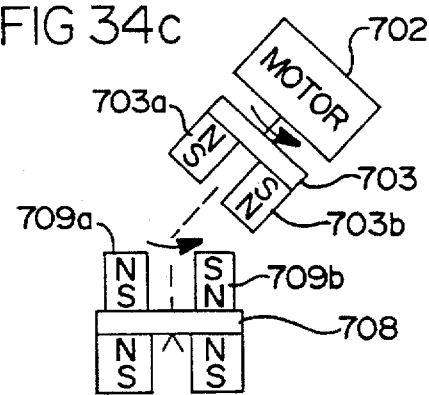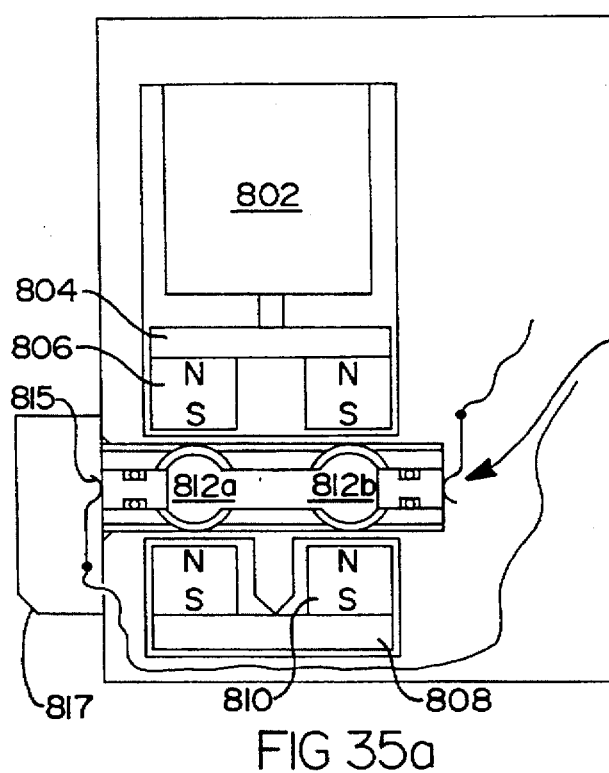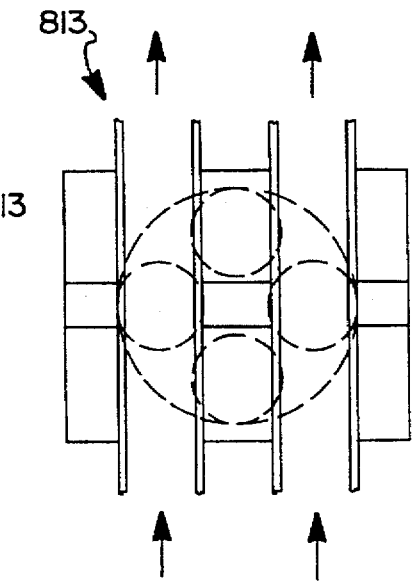

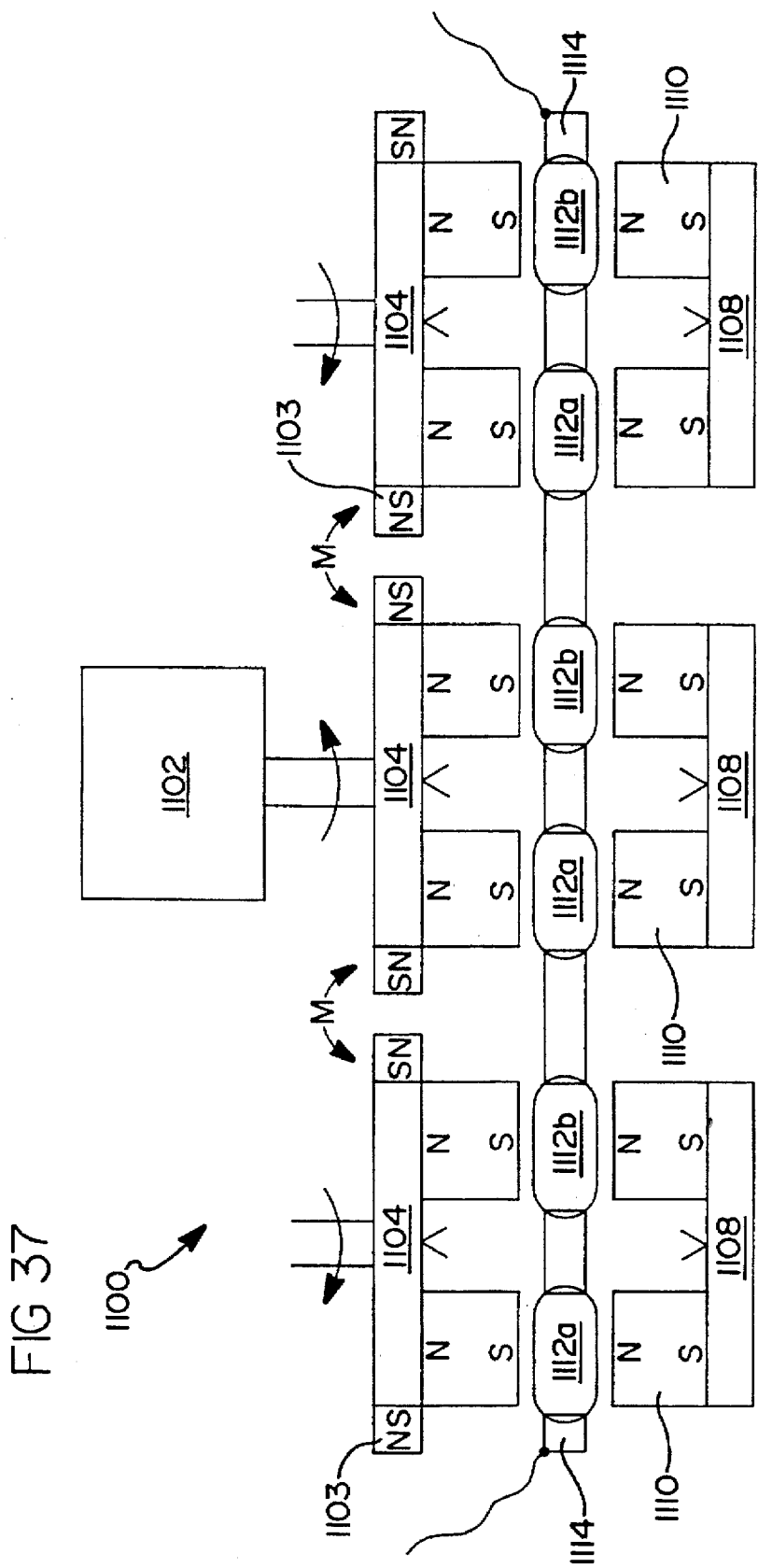

MAGNETIC FLOW SENSOR

CROSS REFERENCE TO RELATED APPLICATION

This application is a continuation-in-part of U.S. application Ser. No. 08/429,534, entitled "Magnetic Flow Sensor", filed on Apr. 26, 1995, and presently abandoned.

TECHNICAL FIELD

This invention relates to fluid flow sensors and, more particularly, to flow sensors which sense fluid flow conductively or capacitively by detecting the potential developed as the fluid moves through a magnetic field. The electrical potential is sensed by at least two electrodes placed opposite each other orthogonal to a magnetic field and contacting the liquid, and has a magnitude proportional to the flow rate of the liquid.

BACKGROUND OF THE INVENTION

In the past, alternating magnetic fields from electromagnets have typically provided an alternating potential which is developed at the electrodes to facilitate signal amplification and processing, and to prevent electrode polarization, a condition which introduces serious measurement error. Alternating magnetic fields, however, introduce several considerations, including a substantial electrical power requirement, the generation of electrical noise, and the requirement of complicated electrical circuits. This invention alleviates such considerations by enabling accurate measurement to be made using permanent magnets and a highly efficient magnetic circuit. The highly efficient magnetic circuit may also be used with flow sensors incorporating electromagnets which will then develop larger potentials at their electrodes and diminish the difficulties associated with those sensors.

Conventional magnetic flow sensors are available in both the probe and the full bore configurations. The invention described herein applies to both forms. Here it enjoys the advantages of relatively high induced voltage, thereby reducing the cost and complexity of the supporting electronics, and relatively low power consumption, a particular advantage for portable instruments.

It is an object of the invention to provide a magnetic flow sensor using permanent magnets which are periodically mechanically repositioned to alternate the magnetic field polarity engaging the conductive fluid, thereby producing an alternating potential at the electrodes.

It is another object of the invention to provide a magnetic flow sensor with a magnetic circuit which substantially increases the potential developed at the electrodes.

SUMMARY OF THE INVENTION

The above and other objects are provided by a magnetic flow sensor in accordance with various preferred embodiments of the present invention. A first preferred embodiment comprises in part a pair of magnetic discs, each disc mounting 4 alternating polarity permanent magnets. The discs are separated from each other and mounted on coaxial bearings so that the magnets from both discs are facing and interacting with each other and aligned to be mutually attractive. A high intensity magnetic flux will then exist between the opposing sets of magnets. One of the discs is connected to a motor for rotation and when rotated, will by magnetic attraction, cause the other disc to rotate. Alternatively, a mechanical connection between the two discs may also be used. A parallel pair of electrically insulating flow passages is located in the space between the magnets of the 2 discs so that the same polarity flux engages both passages at the same time. A pair of electrodes is positioned on the flow passages typically at the outer limits of the flux field while a third electrode is preferably positioned coaxially with the other electrodes and between the passages. The third electrode may be merely a passage for the liquid being measured to provide the signal path so that the generated signals from both flow paths are summed. These signals are then coupled to the supporting electronics circuits for amplification, detection, display and other processing as required for a particular application.

In operation, liquid having at least slight electrical conductivity passes through the flow passages and through an orthogonally oriented magnetic field. The fluid flow generates a voltage at the electrodes. Electrical conductors carry the signal sensed at the electrodes to the circuit board for processing as needed. The magnetic fields are provided by permanent magnets having flux return paths through discs which reduce the reluctance of the magnetic path and thereby increase the flux useful in producing flow signals. The rotation of the field induces a voltage in one flow passage which is nullified by a corresponding equal but opposite polarity voltage in the other flow passage thereby causing no measurement error. However, since the flux polarity in both flow passages at any given time is the same, and the electrodes in those passages are series connected, their flow related voltages are cumulative. As a result, relatively high output flow signals are obtained which enable lower flow rates to be measured.

Electromagnets which typically consume tens of watts or more of power are not used. The power consumption of the present invention, in requiring only tens of milliwatts or less, is much more energy efficient. Furthermore, by avoiding the use of electromagnets, the electrical noise and drifts associated with the switching and stabilizing of these circuits is eliminated and the supporting electronic circuits can be greatly simplified and made at lower cost.

In an alternative embodiment the flow passage is offset from the center of the discs such that the magnetic field primarily from one aligned pair of magnets intersects the flow passage and is also aligned with the electrodes. Multiple wire coils are sequentially energized to provide momentary magnetic fields which interact with the magnets, thus causing the discs to rotate in a concurrent manner.

In still another preferred embodiment, stationary electromagnets are employed in lieu of the permanent magnets. The electromagnets are electrically powered and provide magnetic flux across the flow passages such that the adjacent magnets are energized to provide opposite flux polarities at any moment during operation. Electrical current through the magnetic windings is periodically reversed, which causes all of the magnetic field polarities to reverse so that the generated voltage at the electrodes is correspondingly reversed. Various other preferred embodiments of the present invention are disclosed.

BRIEF DESCRIPTION OF THE DRAWINGS

The various advantages of the present invention will become apparent to one skilled in the art by reading the following specification and subjoined claims, and by referencing the following drawings in which:

FIG. 1 is a longitudinal, cross-sectional view of a probe flow sensor arranged in accordance with the principles of the present invention;

3

Figure 5:
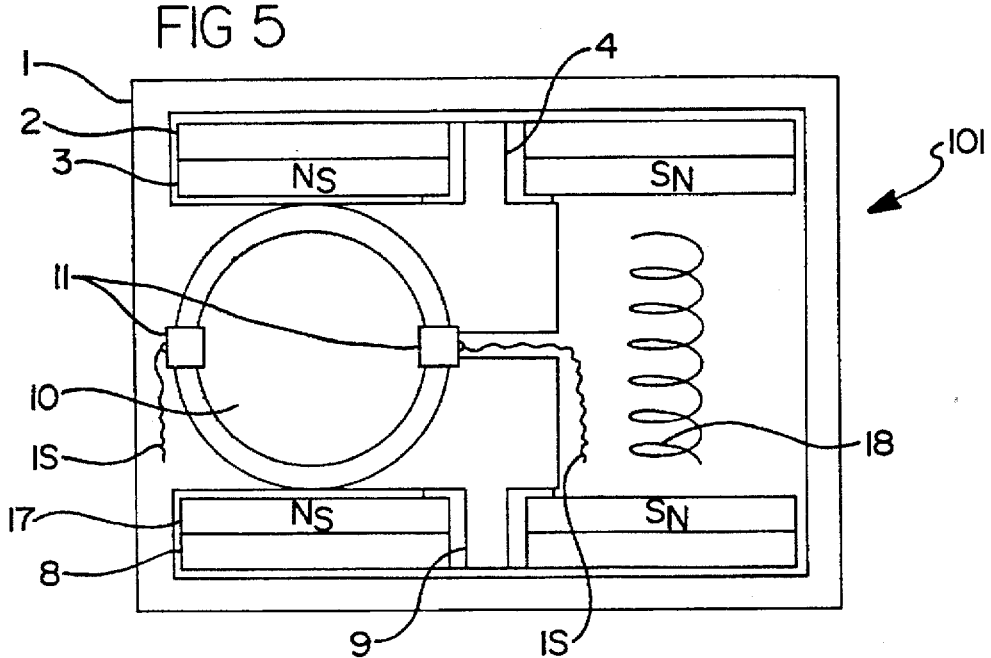
Figure 6:
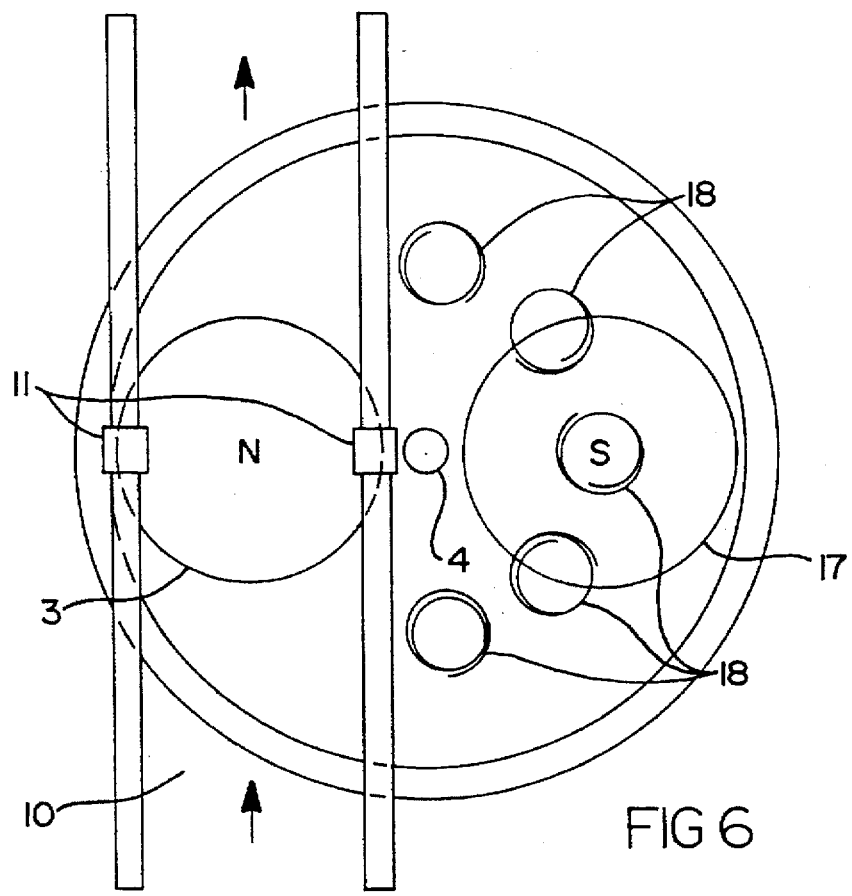
Figure 7:
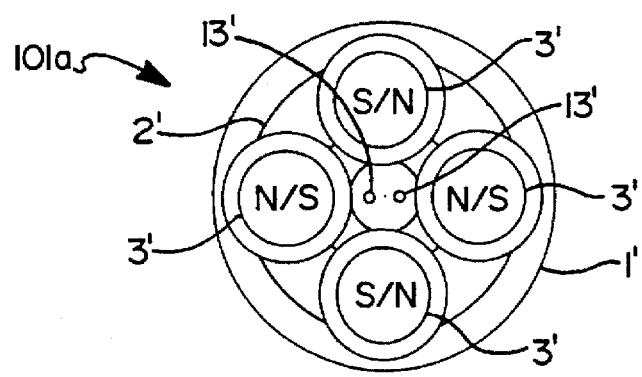
Figure 8:
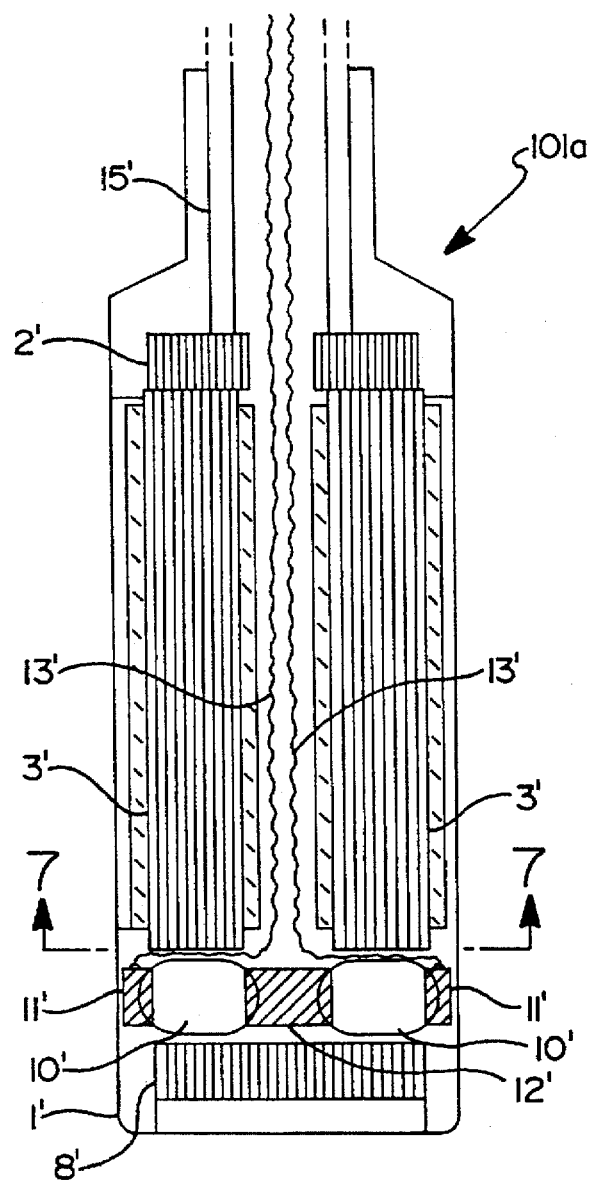

FIG. 2 is a cross-sectional view of the flow sensor of FIG. 1 taken along the line A—A;

FIG. 3 is a cross-sectional view of the flow sensor of FIG. 1 taken along the line B—B;

FIG. 4 is a cross-sectional view of the flow sensor of FIG. 1 taken along the line B—B showing a shortened flow passage;

FIG. 5 is an end view of a full-bore flow sensor in accordance with the principles of the present invention;

FIG. 6 is a cross-sectional view of the flow sensor of FIG. 5 as viewed from the top;

FIG. 7 is a longitudinal, cross-sectional view of a probe flow sensor embodying additional aspects of the invention according to a second embodiment of the invention; and FIG. 8 is a cross-sectional view of the flow sensor in FIG. 7 taken along the line A—A.

Figure 9:
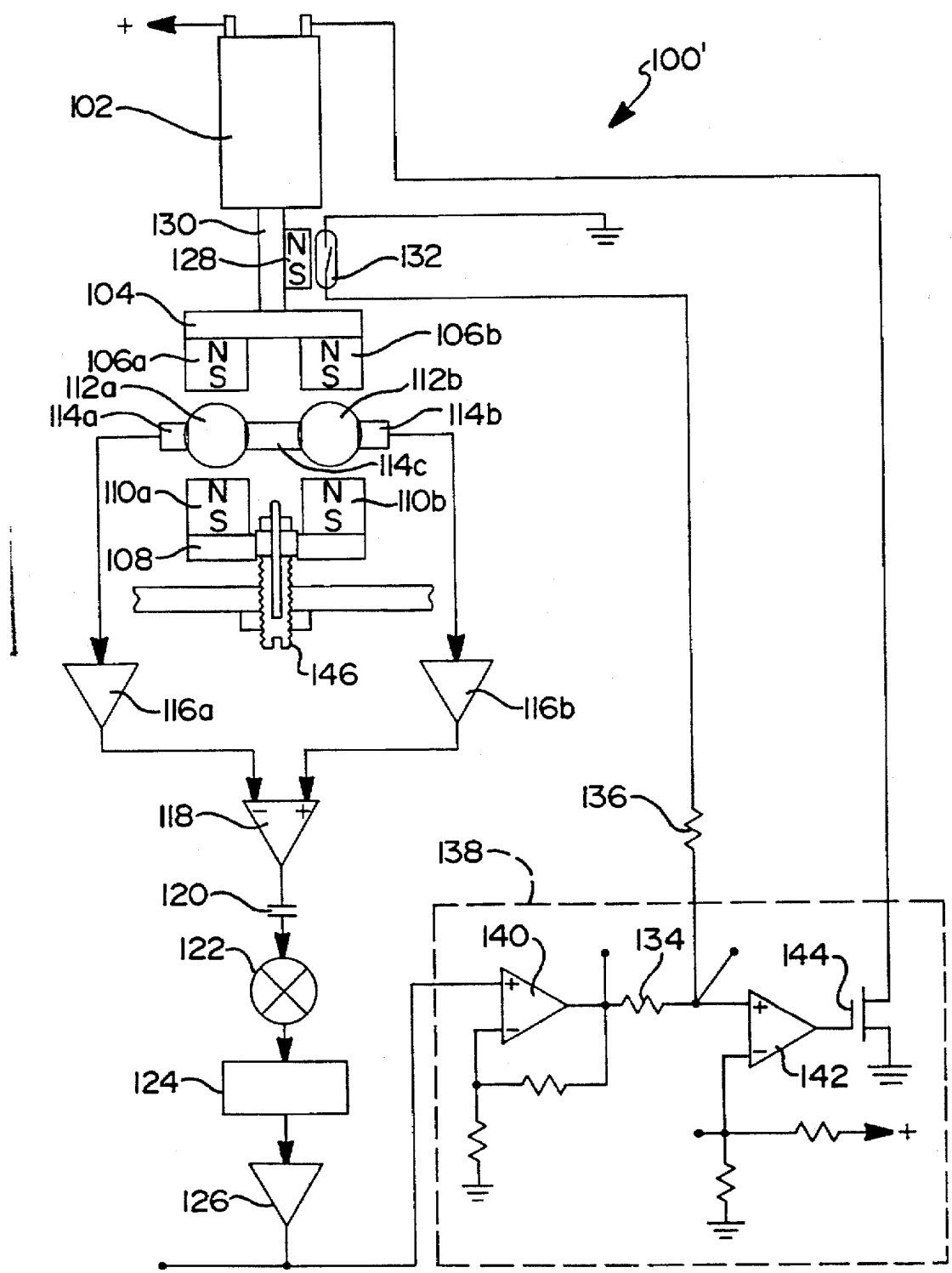
Figure 10:
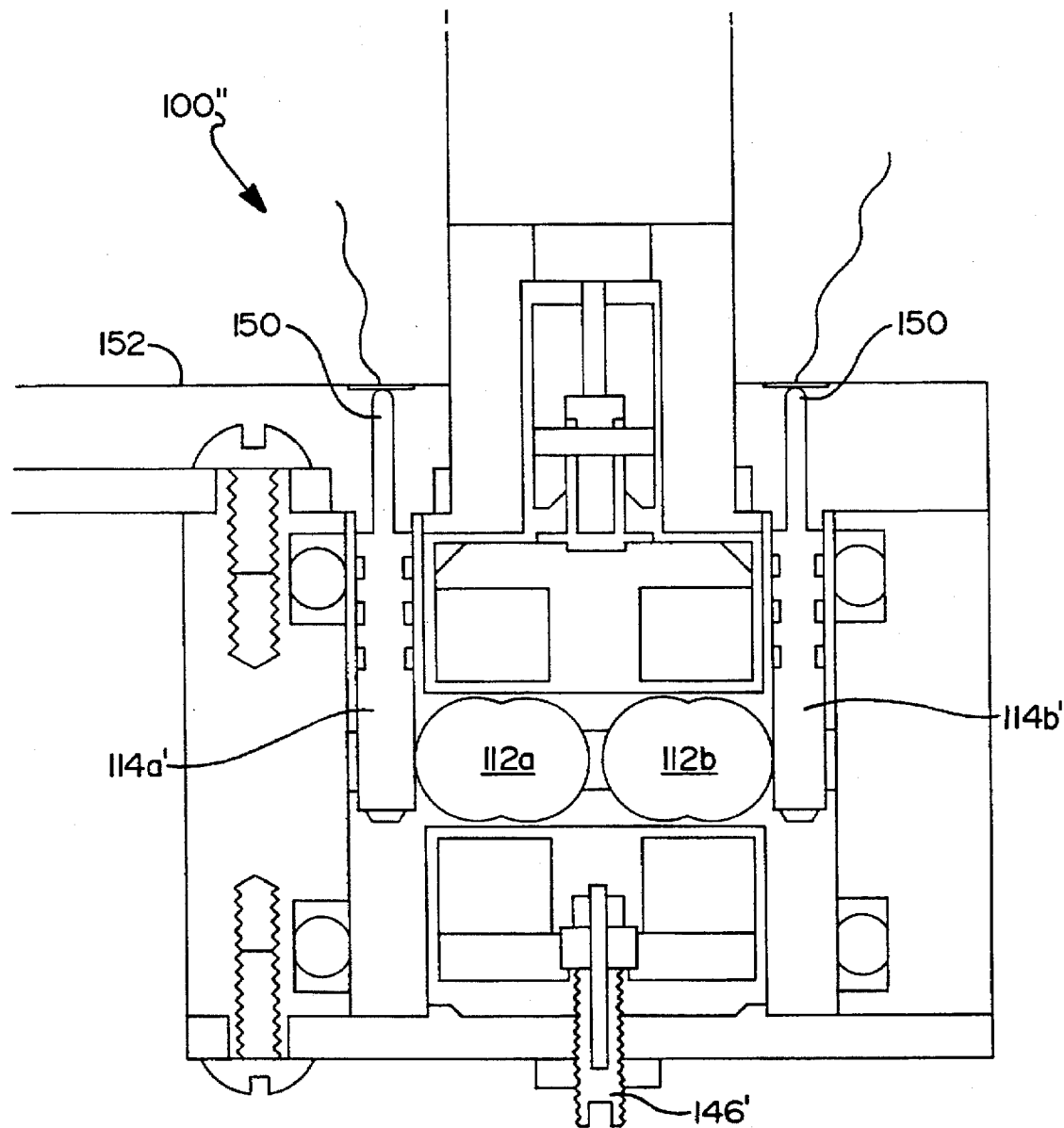
Figure 11:
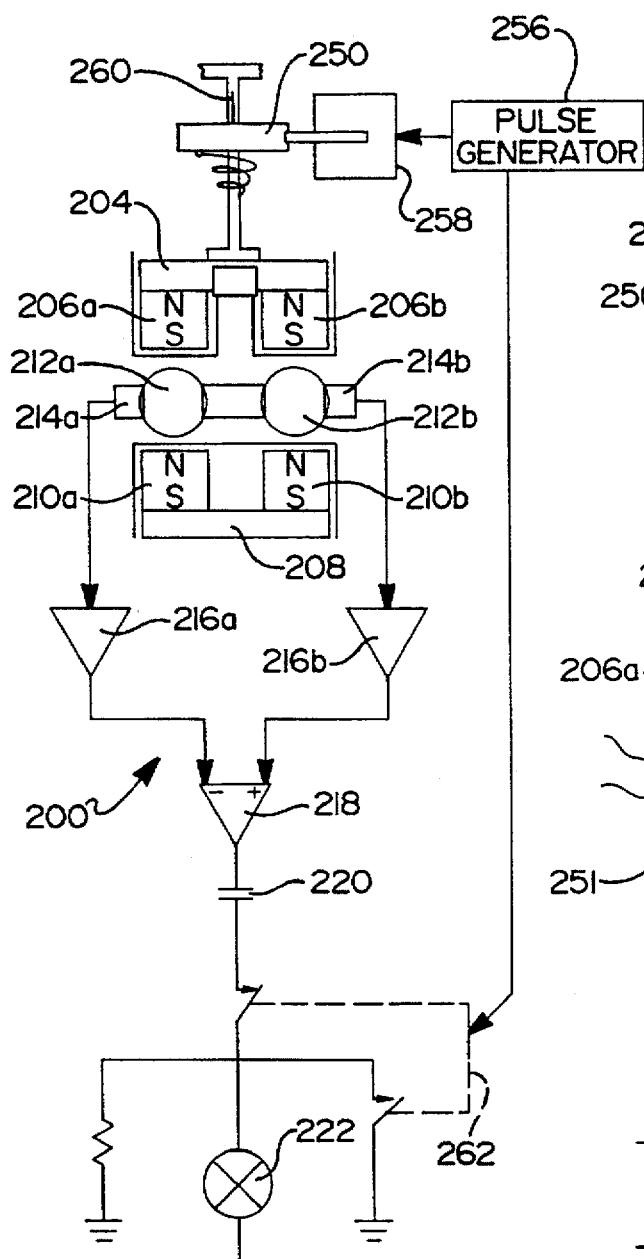
Figure 12:
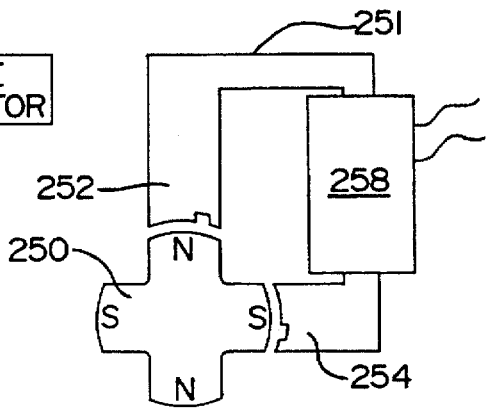
Figure 13:
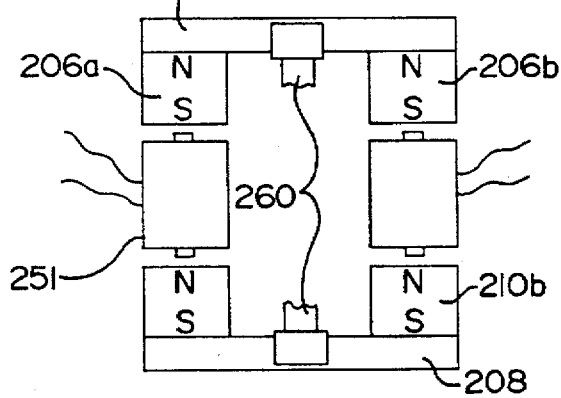
Figure 14:
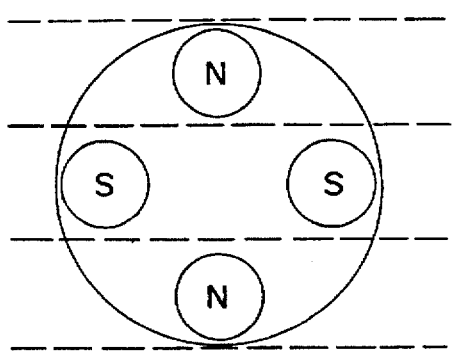
Figure 15:
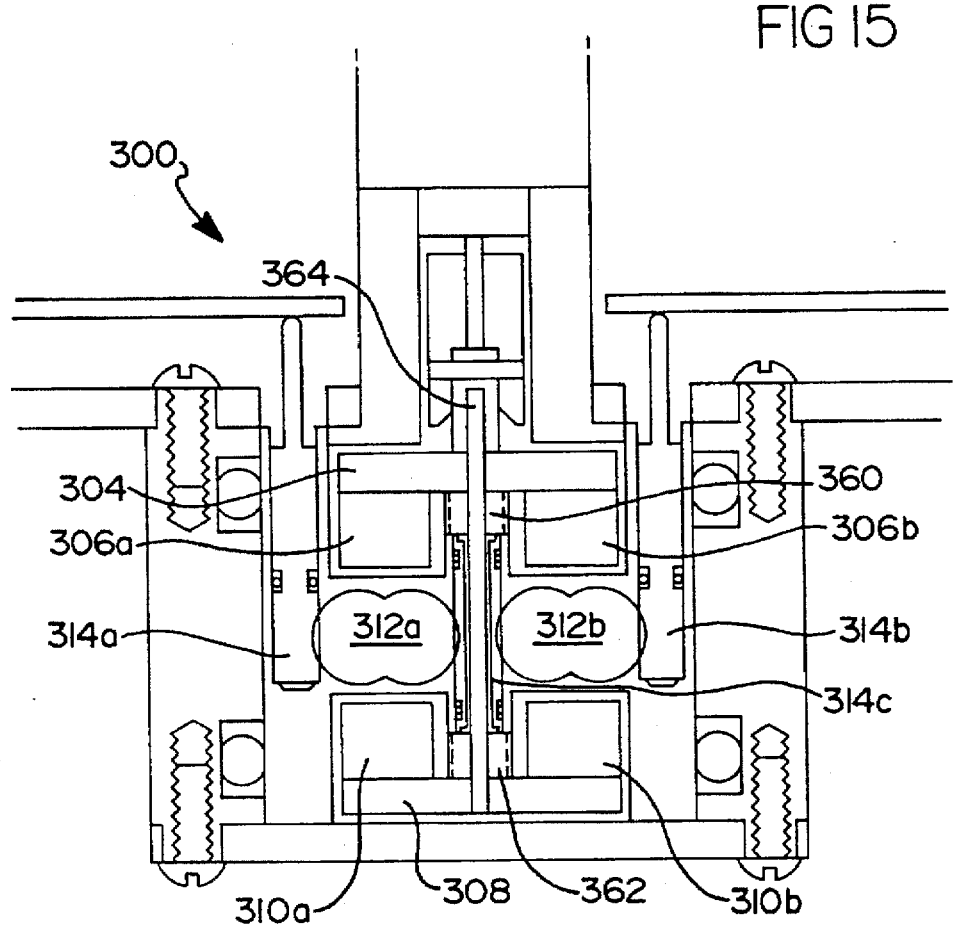
Figure 16:
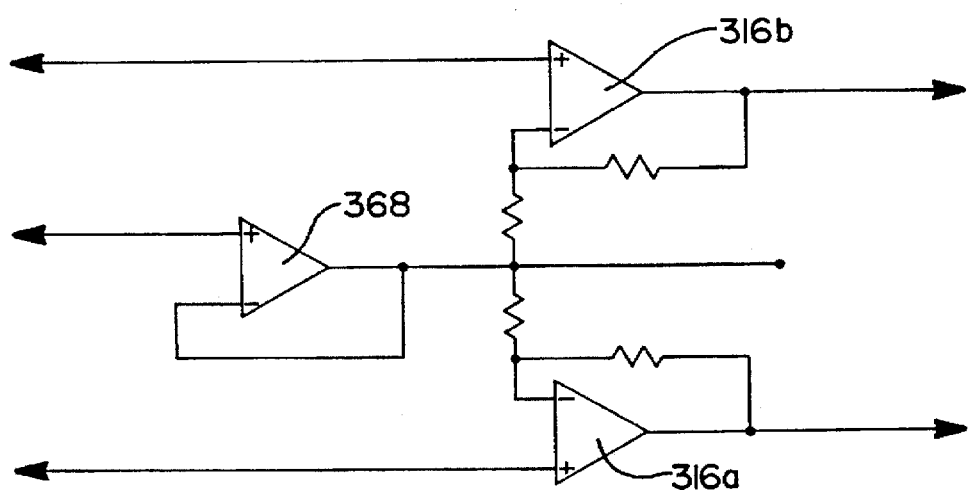
Figure 17:
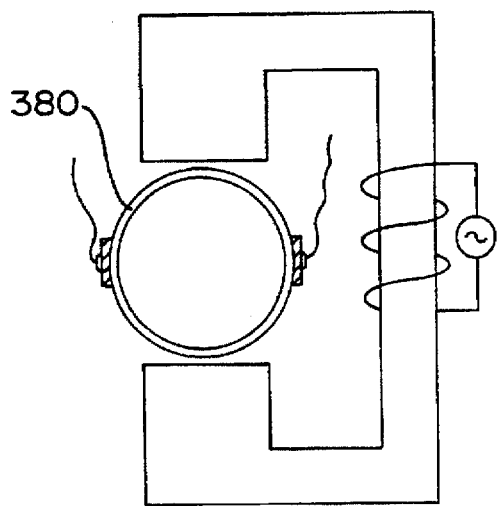
Figure 18:
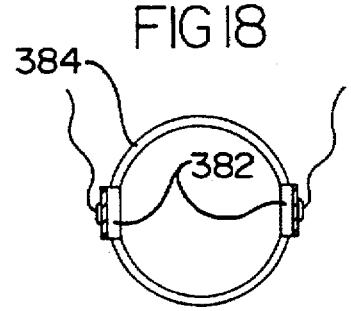
Figure 19:
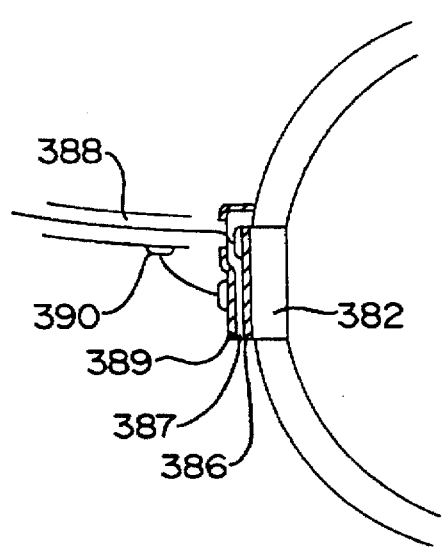
Figure 20:
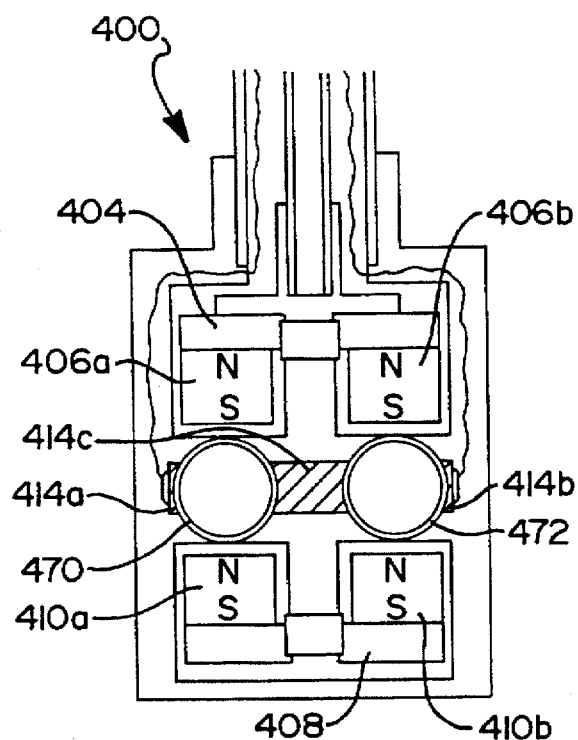

FIG. 9 is an alternative preferred embodiment of a flow sensor of the present invention;

FIG. 10 is another alternative preferred embodiment of the flow sensor of the present invention incorporating elongated, flow sensing electrodes;

FIG. 11 is another alternative preferred embodiment of the present invention;

FIG. 12 is a simplified view of the rotor of the sensor in FIG. 11, the magnetic core and the coil of the same sensor;

FIG. 13 is another preferred embodiment of the present invention showing an arrangement of the disc magnets with a coil/core assembly interposed between the upper and lower disc magnets;

FIG. 14 is a plan view of the flow passages and the magnets of the sensor of FIG. 13;

FIG. 15 is another alternative preferred embodiment of the present invention incorporating a center electrode;

FIG. 16 is a simplified electronic schematic diagram showing the connection of an input amplifier for producing a reference signal from the center electrode;

FIG. 17 is another alternative preferred embodiment of the flow sensor incorporating a flow tube having a conductive coating and electrodes secured to the flow tube;

FIG. 18 illustrates ceramic electrodes used in connection with a flow tube of the flow sensor of the present invention;

FIG. 19 illustrates a flow tube operating in connection with a ceramic electrode having a conductive coating thereon in which a coaxial cable is secured to the electrode;

FIG. 20 is another alternative preferred embodiment of the present invention incorporating dual flow tubes for defining dual fluid flow paths;

FIG. 21 is another alternative preferred embodiment of the present invention incorporating electromagnets and permanent magnets;

FIG. 22 is a partial cross sectional view of the flow sensor in accordance with section line 22—22 in FIG. 21;

FIG. 23 is a partial cross sectional view of the flow sensor in accordance with section line 23—23 in FIG. 21;

FIG. 24 is a partial cross sectional view of the flow sensor of FIG. 21 in accordance with section line 24—24 in FIG. 21;

FIG. 25 is a cross sectional view of the flow sensor in FIG. 21 in accordance with section line 25—25 in FIG. 21;

FIG. 26 is a simplified electrical schematic diagram of a detector and amplifier circuit for use with the flow sensor of FIG. 21;

FIG. 27 is another alternative preferred embodiment of the present invention;

4

Figure 30:
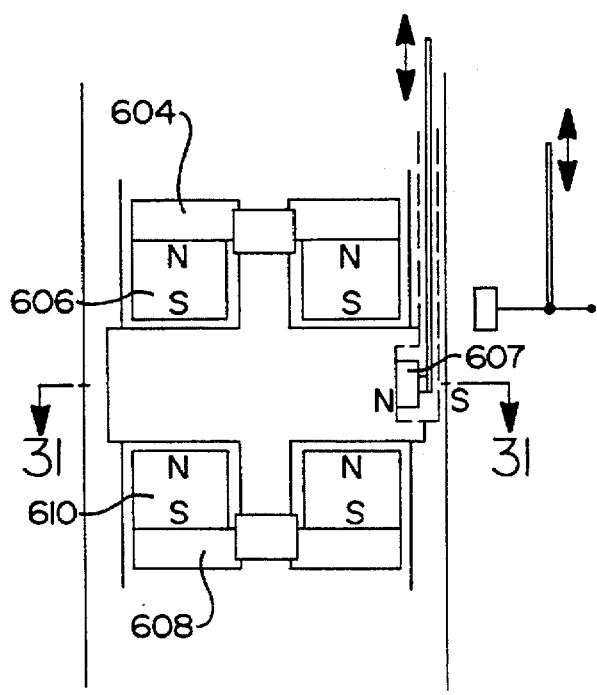
Figure 31:
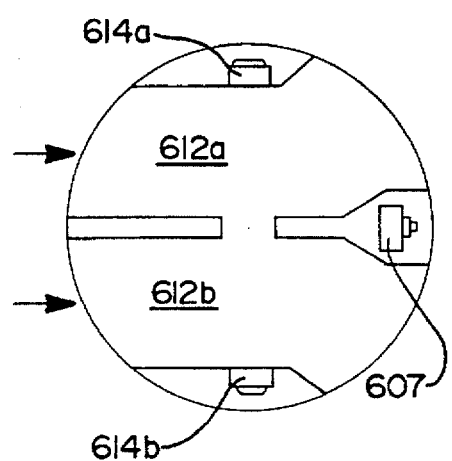
Figure 32:
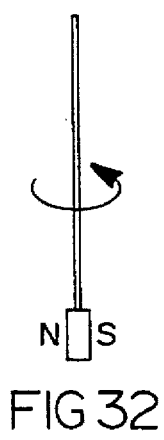
Figure 33:
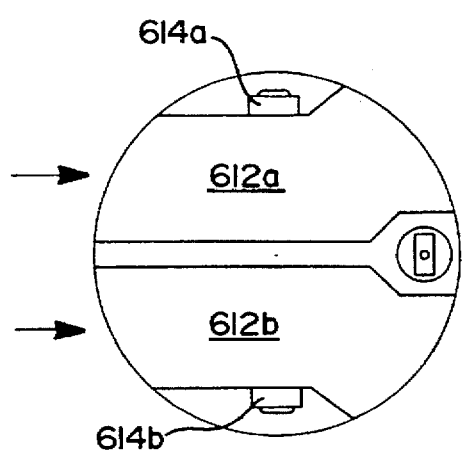
Figure 36A:
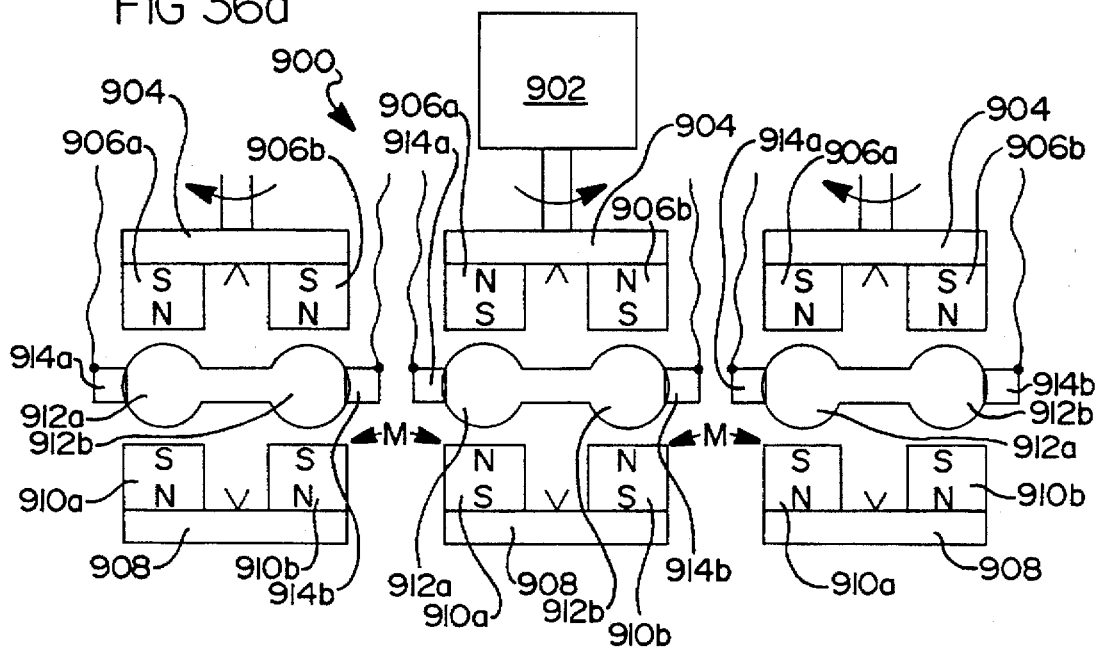
Figure 36B:
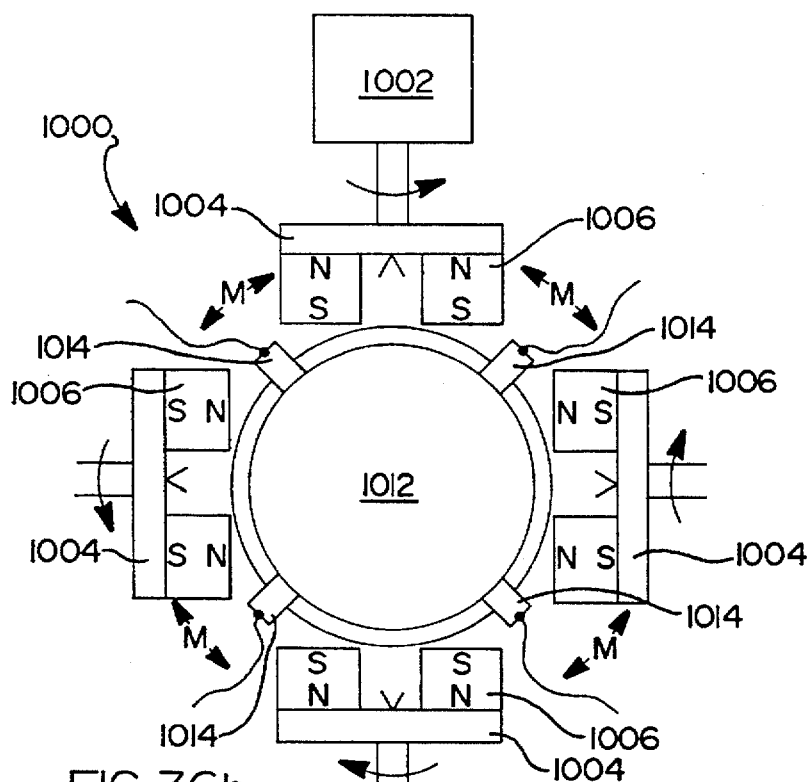
Figure 38A:
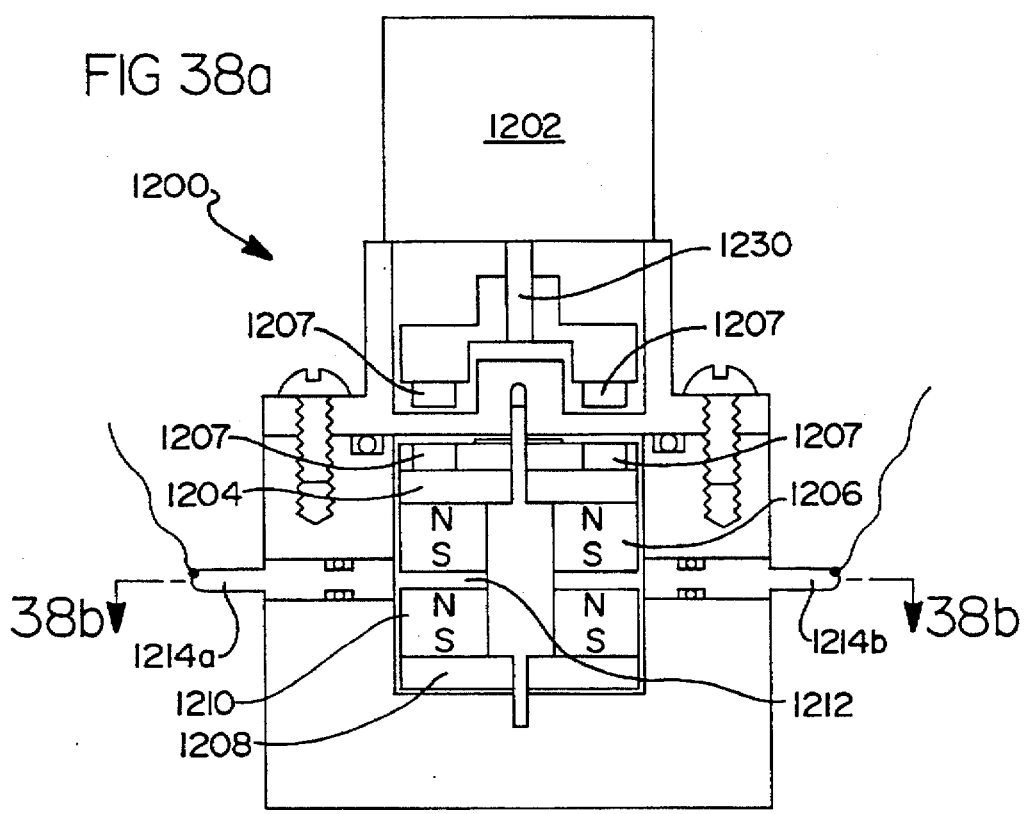
Figure 38B:
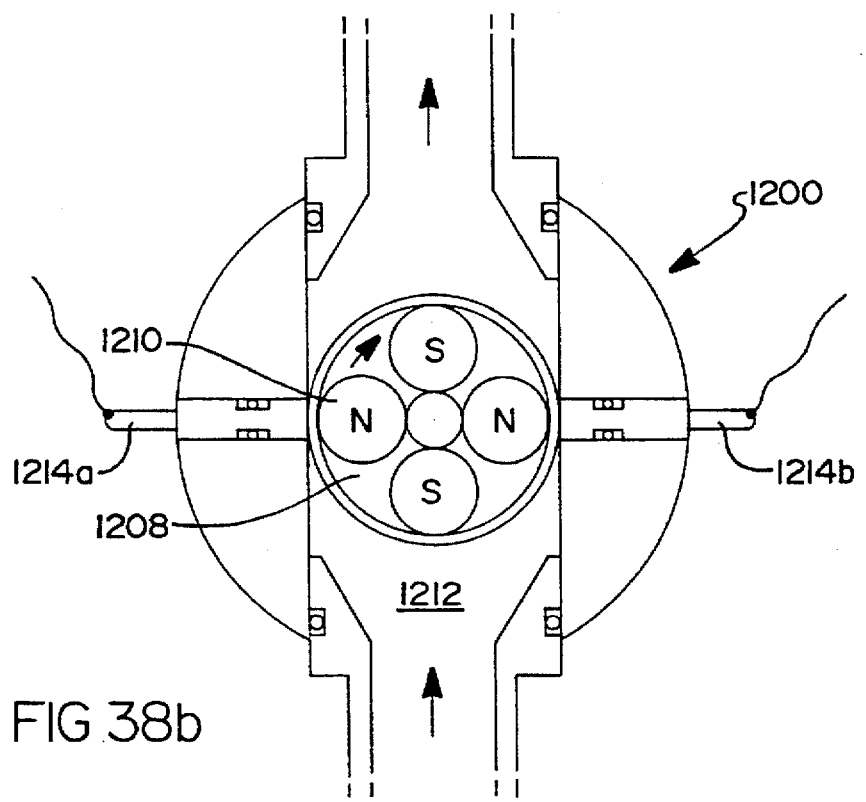

FIG. 28 is a side view of the flow sensor of FIG. 27 in accordance with directional arrow 28—28 in FIG. 27;

FIG. 29 is a partial cross sectional view of the flow sensor of FIG. 27 in accordance with section line 29—29 in FIG. 27;

FIG. 30 is a view of another alternative preferred embodiment of the present invention;

FIG. 31 is a plan view of the sensor in accordance with section line 31—31 in FIG. 30;

FIG. 32 illustrates the rotating torque produced by a permanent magnet of the flow sensor;

FIG. 33 is a plan view of the flow paths and the orientation of a small magnet which causes the desired disc rotation;

FIGS. 34a–34c illustrate various orientations at which a motor of the flow sensor and an associated drive disc may be orientated relative to the flow discs to induce rotation of the flow discs;

FIGS. 35a–35b illustrate another alternative preferred embodiment of the present invention which incorporates a removable flow tube module;

FIG. 36a illustrates yet another alternative preferred embodiment of the present invention in which a plurality of flow sensing discs are rotated by a single motor;

FIG. 36b is another alternative preferred embodiment of the present invention incorporating a plurality of flow discs oriented transverse to one another and circumscribing a central flow tube;

FIG. 37 is another alterative preferred embodiment of the present invention in which small permanent disc magnets are used to rotationally couple a plurality of flow discs; and FIGS. 38a and 38b are another alternative preferred embodiment of the flow sensor of the present invention where the rotating magnets are wetted by fluid being measured.

DETAILED DESCRIPTION OF PREFERRED EMBODIMENTS

FIG. 1 illustrates a preferred embodiment of a flow sensor 100 in accordance with the present invention. A housing 1 is an environmentally protective, electrically insulating, non-magnetic enclosure and support for the flow detecting portions of the sensor. Within the housing 1 is a magnetic disc 2, with four smaller disc permanent magnets 3 mounted to it as illustrated in FIG. 2. The magnets 3 are identical and arranged equidistant from each other and from the center of disc 2, and alternate in polarity as disc 2 is rotated past a fixed point about its central axis. Disc 2 is supported by bearing 4 so that it is free to rotate, and is also connected to a coupling 5 which is in turn coupled to a shaft 6. The rotating shaft 6 connects to the rotating shaft of the drive motor 7 to thereby cause disc 2 to rotate accordingly.

Disc 8 and associated magnets 17, are similarly arranged as described with respect to disc 2 and its associated magnets 3, as illustrated in FIG. 2. Disc 8 is supported by bearing 9 in proximity to disc 2 so that the magnetic fields provided by the respective magnets of discs 2 and 8 align in a mutually attractive orientation whereby the rotation of disc 8 will follow that of disc 2.

Between discs 2 and 8 are two flow passages 10 as illustrated in FIG. 3. At right angles to the passages 10 are two outer pickup electrodes 11 which contact the flowing liquid. The electrodes 11 are disposed generally parallel to the flux path or, viewed differently, perpendicular to the flux path if one considers the position of the electrodes to be defined by a central axis of rotation extending through each electrode 11. Pickup electrode 12 also contacts the liquid and bridges the generated voltages from the two flow passages 10 in a series-like connection. The function of electrode 12 can also be provided by the fluid whose flow is being sensed.

Liquid having at least slight electrical conductivity passes through the flow passages 10 and through an orthogonally oriented magnetic field and generates a voltage at the sensing electrodes 11 and 12. Conductors 13 convey the electrical signal to the electronics board 14 for amplification, detection, display, and further processing as may be required for a particular application. A tube 15 provides a mechanical connection between the housing 1 and the mechanical drive and electronics enclosure 16. FIG. 4 illustrates the flow sensor of FIG. 3 whereby the flow passages are reduced to correspondingly reduce the pressure drop resulting at high flow velocities.

Discs 2 and 8 are preferably formed from a magnetic material, typically soft iron, and provide a return path for the magnetic field. In this way, the air gap in the magnetic circuit is substantially reduced, thereby increasing the field strength through the flow passages 10. Disc 2 and its magnets 3, may alternatively be formed by a single piece of magnetized material and then magnetized as illustrated in FIG. 2. Disc 8 and its magnets 17 may be similarly fabricated.

Although benefiting from the additional flux and greater magnetic circuit efficiency resulting from the use of disc 8 and its associated magnets 17, the sensor may alternatively function without contribution therefrom. A practical sensor can be realized solely using disc 2 and its associated magnets 3 and extending flow channel 10 between the two outer pickup electrodes 11. In such a configuration, electrode 12 may be omitted. Such a sensor, now open on the bottom, would be preferred for applications where large sized particulate matter in the flow stream may close off a relatively small flow passage. The electrodes 11 would be electrically insulated from the liquid where the magnetic field is not present to prevent a reduction of the developed potential due to shunting by the liquid.

In operation, disc 2 is rotated by motor 7 either continuously or in a stepped fashion, whereby a step occurs at least every 90 degrees, to position the most intense alternating magnetic field across the flow passages. The average rotational rate is determined in part by the material polarization rate of electrodes 11 and 12 in the liquid being measured and the characteristics of supporting electronic circuits. A rotational rate from tens to hundreds of RPMs would be typical. Motor 7 may include any one of an AC synchronous and DC quartz clock, DC brush and electronically commutated, or stepper type motors. If a stepper or other type of motor 7 is used which automatically provides the 90 degree rotation, the motor 7 is preferably oriented to maximize the magnetic field through the flow passages 10. If the motor 7 drive does not automatically provide 90° of rotation, a rotation reference such as a photoelectric or magnetic sensor preferably controls motor 7 so that it starts and stops as required, if continuous rotation is not employed. Such reference sensors can also trigger an automatic zero control if they are used.

The motor 7 may be preferably rather small because only bearing friction losses need to be overcome during rotation. If motor 7 operates with a relatively low duty cycle, the power consumption can be very low. The motor 7 may also be advantageously located within the housing 1 cavity.

The electrical signals detected by electrodes 11 are conveyed by conductors 13 to the circuit board 14 in a very low noise environment because the overall power consumption is relatively low and any required electrical switching can be performed at low speeds to avoid severe electrical transients. For example, conventional magnetic flow sensor magnetic field power requirements are typically in the tens of watts, while the motor 7 power requirement is in the tens of milliwatts or less (as in the case of some quartz crystal clock motors). As a result, sensing low flows which produce very low level signals can be performed more economically and, furthermore, lower practical limits to magnetic flow sensing may be established.

Additional housings 1, each having a flow sensing mechanism, may be positioned at different locations on tube 15 and are rotatable by motor 7. This may be accomplished by connecting a second coupler 5 and shaft 6 to disc 8 which then enters a second housing similar to housing 1 with its sensor assembly. Multiple sensors may be used in this manner because the rotation error between sensing units is relatively low when low friction bearings are employed.

FIGS. 5 and 6 illustrate in cross section, the major components of an alternative embodiment 101 of the full bore flow sensor 100. In FIGS. 5 and 6, each disc 2, 8 may have as few as two magnets 3, 17 mounted with opposing polarities. The flow passage 10 is offset from the center of the discs 2, 8 so that the magnetic field primarily from one aligned pair of the magnets 3, 17 intersects the flow passage 10 and is also aligned with electrodes 11.

Bearings 4, 9 support discs 2, 8 and permit relatively frictionless disc rotation. A pair of electrodes 11, detect the developed signal. Multiple wire coils 18 are sequentially energized to provide momentary magnetic fields which interact with the magnets 3, 17 thereby causing the discs to rotate in a stepped manner. In effect, a stepper motor is made which enables disc 2, 8 rotations to be produced, thereby alternating the polarity of the magnetic field intersecting flow passage 10. This configuration offers the further advantage of an integrated electromechanical structure with relatively large output signal for its overall size, and low power consumption.

FIGS. 7 and 8 illustrate yet another preferred embodiment 101a of the sensor. As the components depicted in FIGS. 7 and 8 closely correspond to the physical and functional aspects of similarly numbered components in FIGS. 1 and 2, similar reference numerals having a prime (e.g. 3') designation correspond to similar components of FIGS. 1 and 2. In FIGS. 7 and 8, four stationary electromagnets 3' are electrically powered and provide magnetic flux across the flow passages 10'. Even though similar electromagnetics may be located below flow passages 10' and provide additional magnetic flux like that of the magnets 8 of FIG. 1, the added complexity and size suggests that the flux paths are through disc 8. The magnets 3' are energized so that adjacent magnets have opposite flux polarities at any moment during operation. Electrical current through the magnet 3' windings is periodically reversed, causing all of the magnetic field polarities to reverse so that the generated voltage at the electrodes 11' and 12' is correspondingly reversed, thereby preventing their polarization and resultant signal errors.

Sense wires 13' are attached to the sensing electrodes 11' and are routed through stem 15' to the signal amplifying and processing electronics. Item 1' is the electrically insulating housing which holds all of the components together.

Conventional magnetic flow sensors typically have rather substantial air gaps for the magnetic field. This invention effects a substantial reduction in this gap and provides the benefits of using reduced magnetic fields to provide electrical power and/or increased output signal. It will be understood by one skilled in the art that if the lower disc 8' is removed so that the bottom of the sensor is open to the flow, the air gap remains substantially smaller than that of conventional single magnet flow sensors.

Referring to FIGS. 9 and 10, there is shown a flow sensor 100' in accordance with another alternative embodiment of the present invention. This flow sensor 100' has the advantage of reducing the average electric power required to operate the flow sensor 100' by "shedding" the electromechanical mechanism for changing the position of the magnets. A separate sensing switch is for repositioning the permanent magnets when load shedding commences.

With specific reference to FIG. 9, a motor 102 is used to rotate an upper disc 104 having two permanent magnets 106a and two permanent magnets 106b secured thereto. A lower disc 108 has two permanent magnets 110a and two permanent magnets 110b secured thereto in spaced apart relation with the magnets 106a, 106b and separate flow conduits form fluid flow paths 112a and 112b. Sensing electrodes 114a, 114b and 114c are wetted by the fluid flow in the flow passages. It will be appreciated that only one each of the magnets 106a and 106b, and one each of magnets 110a and 110b are visible in the drawing of FIG. 9. This is also true for the remaining figures which show a cross-sectional view of a sensor illustrating two magnets. In these instances it will be appreciated that each disc has two additional magnets of opposite polarity which are not shown.

Electrodes 114a and 114b are further coupled to amplifiers 116a and 116b. The outputs of amplifiers 116a and 116b are input to a differential amplifier 118. The output of the differential amplifier 118 is provided via a capacitor 120 to a detector 122. The detector 122 transmits its output to a low pass filter 124, and the output signal from the low pass filter 124 is transmitted to an amplifier 126.

With further reference to FIG. 9, a "stop location" magnet 128 is secured to a shaft 130 which is rotated by the motor 102. A reed switch 132 is positioned closely adjacent the magnet 128 and electrically coupled via resistors 134 and 136, which form a voltage divider circuit, to an amplifier circuit 138. Amplifier circuit 138 includes a first operational amplifier 140, second operational amplifier 142 and a field effect transistor (FET) 144.

In operation, as the motor 102 rotates it causes concurrent rotation of the disc 104. Since the lower disc 108 is magnetically coupled to the upper disc 104, the lower disc also rotates with the upper disc. The signals sensed by electrodes 114a and 114b are amplified by amplifiers 116a and 116b and then by the differential amplifier 118 prior to being decoupled by capacitor 120 and detected by the detector 122. The resultant DC signal with its ripple voltage corresponding to the rotation of the magnets 106 and 110 is then passed through the low pass filter 124 to remove the ripple component and then through the output amp 126 to provide the desired output signal level.

With further reference to FIG. 9, to explain the load shedding circuit operation, if it is assumed that the flow output signal is about 0–2 volts for a flow rate of 0–20 gallons per minute (GPM), then the signal generated would be 0.025 volts at a typical cutoff rate of, for example, 0.25 GPM. At this flow rate, with the gain of 10 for op amp 140, the output would be 0.250 volts. Each time the reed switch 132 is within range of the stop location magnet 128 mounted on the motor shaft 130, it closes and, through the voltage divider formed by resistors 134 and 136, reduces the positive input voltage to op amp 142 to 0.200 volts. This voltage is still that which is sufficient to enable its output to be high and maintain normal sensor operation. However, when a reduced flow rate forces this voltage to be lower, op amp 142, with its negative input voltage fixed to 0.200 volts, will have a low output, thereby cutting off the FET 144 and deenergizing the motor 102.

When the flow rate rises sufficiently while the sensor 100' is in its powered-down state, sufficient electrode signal is produced before significant polarization occurs and the DC decoupling has a sufficiently long time constant so that the voltage on the positive input of the op amp 142 reaches at least 0.200 volts. This causes the motor 102 to be energized and normal sensing operation to resume.

With further reference to FIG. 9, it will be appreciated that the reed switch 132, in addition to being a mechanical reference for the stopping position, provides hysteresis. The flow rate signal has a long time constant so that with a sharp reduction in flow sufficient to cause load shedding to occur the motor 102 will continue to operate until the correct stopping position is reached. While the DC decoupling capacitor will theoretically prevent very slow and smooth increases in flow rate from ultimately producing the flow output required to return the flow sensor 100' to normal operation from a load shedding state, such operation is considered to be extremely abnormal and highly unlikely because of normal turbulence and pressure fluxuations.

It will also be appreciated that a number of other position-oriented stopping methods which are known in the art may also be employed. With the flow sensor 100' in a powered-down state, the magnetic flux is maintained so that a flow-related signal can still be produced to bring the flow sensor up to the fully operational state. Rotational control and power control can similarly be applied when noncontinuous rotation motors such as stepper or oscillating types are employed. In these cases magnet 128 and reed switch 132 may not be needed as the inherent rest positions of these motors can be oriented to automatically position the magnets over the flow passages during a load shedding state. In applications involving domestic water usage, since the duty cycle of domestic water usage can be very low, the flow sensor 100' provides the economic advantage of longer battery maintenance intervals, reduced battery costs and smaller overall size which are all extremely important factors with commercial flow sensors. It will also be appreciated that the powered-down state could include other optional components of the flow sensor 100', such as a microprocessor, display or ND convertor.

With further reference to FIG. 9, the flow sensor 100' also includes a means for calibration. In the domestic water meter example given above, the distance between the discs 104 and 108 may be changed by a lockable adjustment screw 146. The adjustment screw 146 is used to position the lower disc 108, and thus the magnets 110, closer to or farther from magnets 106 of the upper disc 104. The adjustment screw 146 thus allows a degree of variability of the amount of magnetic flux active in the flow passages 112, which in turn allows a degree of adjustability of the magnitude of the generated voltage sensed by the electrodes 114. The adjustment screw 146 thus forms a simple yet effective means for enabling mechanical calibration of the flow sensor 100' to be performed.

Referring briefly now to FIG. 10, another improvement of the flow sensor 100' is illustrated. This flow sensor 100" is essentially identical to the flow sensor 100' with the exception of the electrodes 114, which are elongated, cylindrical electrodes 114a' and 114b'. The electrodes are orientated orthogonal to the axis of the fluid flow paths 112a, 112b. The elongated electrodes provide the advantage of being easily inserted to a precise depth, anchored in place and sealed against leaks. Each electrode 114' further includes a rugged post 150 which allows electrical contact to be made directly with the supporting electronics PC board 152.

Referring now to FIGS. 11–14, there is shown another alternative preferred embodiment 200 of the present invention. The flow sensor 200 is similar to the flow sensor 100, and like components of the flow sensor 200 are designated by reference numerals corresponding to those used in connection with the description of the flow sensor 100 but increased by 100. For example, the upper and lower discs of the flow sensor 100 have been designated by reference numerals 104 and 108, and the upper and lower discs, respectively, of flow sensor 200 are designated by reference numerals 204 and 208, respectively.

The use of a stepper motor in connection with the flow sensor 200 provides several distinct advantages. Principally, stepper motors offer low power consumption, relatively small in size, relatively low cost and long life. With the flow sensor 200, although the motor need only overcome friction and mechanical unbalance in order to rotate the discs 204 and 206, these loads are still significant in terms of the desire to operate the sensor 200 for long periods from a small battery. Therefore, it is important that all efforts be made to optimize the efficiency of the sensor 200. As an example, it will be noted that no gear train is incorporated with the sensor 200.

Referring further to FIGS. 11 and 12, the flow sensor 200 incorporates a rotor 250, which is formed from a 4-pole magnet of alternating polarity poles. The rotor 250 automatically positions itself such that its poles are mechanically aligned with core ends 252 and 254 of a core 251 to which it is magnetically attracted. The disc magnets 206 and 210 are then positioned stationary directly over the flow passages 212a and 212b and flow sensing may then take place.

With further reference to FIGS. 11 and 12, when a pulse from a pulse generator 256 is impressed across a coil 258, the magnetization of the core 251 is such that its magnetic poles are momentarily of the same polarity as those of the adjacent rotor poles of the rotor 250. Since like poles repel, the rotor 250 will immediately rotate in one direction by 90° to reestablish the mechanical orientation where the rotor and core poles are mutually attractive. A continuing series of alternating polarity pulses from the generator 256 continues to force the rotor 250 to rotate in 90° increments, the resting position between pulses being such that four of the disc magnets 206 and 210 are always in alignment with the electrodes 214 to facilitate the generation of a flow related signal.

In FIGS. 11 and 12, the member being directly magnetically driven is the rotor 250 which is a separate component from the discs 204 and 208. However, it is also possible to directly act on the discs 204 as illustrated hereinbefore. Another example is illustrated in FIG. 13 in which the disc magnets 206 and 210 not engaging the flow passages 212 are, as in FIGS. 11 and 12, acted upon by an alternating polarity post magnetic field to produce a 90° rotation. It should be noted that the presence of the core 251 can provide a useful reduction of the air gap, thus increasing the magnitude of signals generated by the electrodes 214.

With further regard to FIGS. 11–13, both discs 204 and 208 can be supported by a single, angularly compliant bearing 260 so that the magnetic attraction between the discs 204, 208, combined with the pivotal geometry moment, is self balancing. In FIG. 13, this feature is of particular interest because it facilitates the manufacturing treatment of a flow sensing module which integrally contains the mechanism for disc rotation.

While the direction of rotation is not important for the applications described herein, it can be determined nevertheless using core slots and/or magnetic biasing or other existing methods. It is also possible for the rotor 250 to rotate first in one direction and then in the other and so forth. It is also notable that, for example, the rotor 250, discs 204 and 208, and an anchored balance wheel hairspring can function as a resonant circuit and with other techniques like that used on clocks, provide this type of oscillatory movement very efficiently. In this instance, the rotor 250 could be rigidly attached to the upper disc 204 and the electrical pulsing would occur either once or twice per cycle as may be desired. Oscillatory configurations could also be used with electromechanical drivers of the piezoelectric and magnetostrictive types which deliver small mechanical movements. If an oscillatory movement is used, it is desirable to regulate the magnitude of the swing so that the maximum flux can be active in the flow passages 212 and to maintain it constant for best repeatability, particularly if an averaging detector is used. A peak detector is more tolerant of the swing variations providing that a minimum magnitude corresponding to that which produces the maximum flow related signal is maintained. The same electromagnets used for producing the mechanical rotation can preferably provide electrical signals corresponding to rotational rate and direction and, when amplified, provide the feedback signals for sustaining the required movement. When the movement is oscillatory, a return spring or other force may beneficially be used, for example, to establish a high efficiency resonant operation.

The coil 258 may be energized with relatively shod, low energy pulses in an efficient design. One consideration of such a design is that the mass of the discs 204, 208 is relatively large compared to that of the rotor 250 and that a means is required to store and transmit the energy represented by a rotor step to the discs 204 and 208. One way of accomplishing this is with a torsion spring which makes the mechanical connection between the upper disc 204 and rotor 250. The spring, in effect, quickly winds up almost 90° when the rotor 250 is pulsed and unwinds relatively slowly releasing its stored energy as it rotates the disc 204 to return the discs 204 and 208 into alignment with the rotor 250.

When relatively high energy electrical pulses energize inductive circuits, as is likely to be the case with stepper motors, a significant amount of electrical noise can be generated. Means such as shielding and balanced circuits and layout, though effective, may not reduce the noise to acceptable levels. An additional means for doing so, however, is by the use of a switching arrangement whereby during each pulse, and for a shod time thereafter to allow normal circuit operation to be reestablished, the path of the amplified electrode signals is broken by an electronic switch 262 (FIG. 11) so that any signal produced then does not contribute to the overall output from the flow sensor 200.

Referring now to FIGS. 15 and 16, yet another alternative embodiment 300 is illustrated. Components similar to the flow sensor 200 are designated by reference numerals increased by 100. The flow sensor 300 is substantially identical to the flow sensor shown in FIG. 10 with the exception of the inclusion of a center sensing electrode 314c extending orthogonally to the flow paths 312a and 312b and between these flow paths. It will be appreciated that the ability to detect rapid changes in flow rate is an important consideration in some applications such as blood flow monitoring and chemical process injection activities. This ability can be obtained in an at least two ways with the embodiments of the present invention described herein. The first way is to change the rate of the flux polarity reversal, and therefore the mechanical relocation rate of the flow sensing magnets 306 and 310, to a relatively high rate compared to that of the flow rate changes. For example, if the discs 304 and 308 would ordinarily rotate at one revolution per second, they would instead be rotated ten or even 100 times faster. These rotational rates are not mechanically excessive and, while representing a maximum of only 3600 RPM, enable a sampling rate of 20 times per second to be achieved. Higher speeds and sampling rates are, of course, also possible if needed.

It should also be noted that the rotating magnets 306 and 310, as shown in FIG. 15 and FIG. 14, are oriented in a balanced opposing flux polarity configuration. It is particularly important that, because of the high speed of rotation of discs 304 and 308, the common mode signals which are generated from the magnet movements are therefore relatively large, and are inherently cancelled with the series connection of the electrodes 314, thereby leaving only the flow responding signals to be amplified. The calibration factor, as in the other configurations described herein, is essentially independent of the rotating speed of the magnets 306 and 310 over a wide range.

With further reference to FIGS. 15 and 16, modern conventional magnetic flow sensors use electromagnets which, because of their inherent inductance, require appreciable time for the flux to build up and stabilize after the application of the voltage pulses. Consequently this method of generating an alternating magnetic field seriously limits the rate at which the flux polarity can be changed while preserving other sensor characteristics such as the ability to sense low flow rates which usually require high flux levels. By contrast, when using magnets which provide a constant flux such as permanent magnets, and mechanically repositioning the permanent magnets to alternate the flux polarity through the flow passages, the sensor characteristics are easily preserved over a wide range of sample rates.

With reference to FIG. 16, the second way to detect rapid changes in flow rate is to utilize the very high input resistance (typically 10,000 megohms) of the amplifiers 116a and 116b shown in FIG. 9 to enable the polarization of the electrodes 314 to proceed so slowly that the discs 304 and 308 can remain in a fixed position for a relatively long time without seriously affecting sensing qualities before being repositioned to alternate the magnetic polarity. A sensing window of several seconds to several minutes, for example, can be established before alternating the magnetic polarity. This way is particularly effective when the flow rate profile is a series of short, high-rate pulses. Such a series of short, high-rate pulses might be produced, for example, from a diaphragm pump. With the use of a stepper motor to preposition the magnets, the time required to complete the reversal of the magnetic polarities can be very small compared to that of the sensing window, and the resulting sensing error can be similarly small.

With further reference to FIG. 15, it is often convenient to use the two discs 304 and 308 with permanent magnets which are free to rotate with respect to each other in a mutually attractive fashion so that a rotation of one of the discs will cause the other to similarly rotate. It is also possible, and some times advantageous, to mechanically attach the two discs 304 and 308 with their magnetic fields aligned to be mutually attractive. An example of this is illustrated in FIG. 15 where the center electrode 314c is O-ring sealed and supports upper and lower ball bearing races 360 and 362, respectively, through which a shaft 364 attaches the discs 304 and 308 to each other. One advantage of this form of mechanical disc attachment is that the bearing system supporting the discs 304 and 308 does not experience the loading of the magnetic attractive forces between the discs. This results in reduced bearing requirements and friction losses and, when these factors become important enough, as in a sensor application for very low power and/or high speed operation, may significantly reduce costs and/or improve performance.

Another advantage of mechanically attaching the discs 304 and 308 as one piece is that no movement exists between them which might alter their mutual alignment, thereby changing the magnetic field and causing noise or error in the flow-related signal. This consideration is particularly applicable for high speed, stepped and/or high repeatability operation. Furthermore, any misalignment of the magnets 306 and 310 due to the effects of gravity, which may cause a calibration error in a freely pivoting bearing arrangement, will be eliminated.

With reference now to FIG. 16, in some magnetic flow sensing applications where minimum metallic contact is desired, as in the case of sensing the flow rate of purified water, the center electrode 314c can also be used to establish, as a reference signal, the intermediate electrical potential of the fluid in the vicinity of other side electrodes 314a and 314b. The voltage potential sensed by the center electrode 314c is amplified by the high input resistance of an op amp follower 368 in order to serve as a practical reference.

Referring now to FIGS. 17–20, various improvements to the flow sensor described herein are illustrated which make the flow sensor of the present invention particularly well adapted to sensing the flow of liquids containing abrasives and liquids which may be adversely affected by metallic contact. The sensing of these types of liquids place special requirements on flow sensors in order to reliably sense the fluid flow of such liquids without suffering unacceptably high wear and without affecting the liquid through metallic contact therewith.

Conventional magnetic flow sensors designed to meet such needs often use ceramic flow tubes for abrasion resistance and field replaceable electrodes. Platinum electrodes are usually specified for minimum chemical effect. However, platinum electrodes are seriously deficient for sensing very pure and/or chemically aggressive liquids containing abrasives. Such liquids might be used, for example, in the manufacture of semiconductors.

FIGS. 17–20 illustrate various elements of alternative embodiments of the magnetic flow sensor of the present invention. The various elements are configured such that abrasion resistance is combined with chemical inertness. The basic principal employed is to use an inert dielectric barrier, whereby the flow generated signal is coupled capacitively between the liquid and electrically conductive terminations shown in cross hatching in FIGS. 17–20. With specific reference to FIG. 17, the barrier employed is a thin wall ceramic tube 380 with a high dielectric constant. For such a thin wall ceramic tube, the resultant capacitance coupling values, which can vary from several 10's to several 1000's of picofarads, or even higher, depending upon the tube properties and conductive area, is quite sufficient, when coupled to high input impedance amplifiers, for practical sensor operation.

Referring specifically to FIG. 18, ceramic electrodes 382 with a high dielectric constant are located in a dielectric flow tube 384 of different electrical and/or mechanical properties for reasons of economy, manufactureability, etc. For example, the ceramic electrodes 382 may be similar to the ceramic elements in small ceramic disc capacitors and their use in place of metal electrodes may reduce sensor cost.

The performance of any type of electrode can be enhanced by electronic means. Referring specifically to FIG. 19, a conductive coating 386 is directly applied to the ceramic electrode 382. An insulating coating 387 is applied over the first coating and then another conductive coating 389 is applied overall with the exception of a small area to enable a connection to be made to the first conductive layer without it being shorted to the second conductive layer. The conductive coating 386 is electrically coupled to the center conductor of coaxial cable 388, which is connected at its other end to the input of a high input resistance amplifier. The shield 390 is driven at nearly the same potential as the signal, thus almost completely cancelling the shunting affects of stray capacitance. This enables the amplifier to respond to electrode signals with very high series capacitive reactance, essentially to alternating electrical charges, and makes possible flow detection of fluids which are very nearly electrical insulators. A charge-coupled amplifier like that often used with piezoelectric transducers and other capacitive sensors is another example of the means for amplifying those charges. Such detection sensitivity is enhanced by the use of a relatively high flux reversal rate and would be particularly benefited by the use of rectangular or wedge-shaped magnets, for example, which can increase the number of magnetic poles on a disc and larger diameter discs. Flux reversal rates well into the kilohertz rang are thereby possible at relatively low motor shaft speeds, as usually required for long operational life. Electromagnets, which have a much higher rate capability can also be used preferably above and below the flow passages.

Referring to FIG. 20, a flow sensor 400 in accordance with another alternative embodiment is shown. The flow sensor 400 uses slaved rotating permanent magnets 406 and 410 with flow tubes 470 and 472 which have relatively thin walls, and which are used to capacitively couple the flow related signal to the electrodes 414, which may be a thin conductive coating. Ceramic electrodes, as shown in FIGS. 18 and 19, could also be used.

Referring now to FIG. 21, a further embodiment of a flow sensor in accordance with the present invention is shown which incorporates a stepper motor. When using permanent magnets, the invention preferably includes some sort of mechanical movement typically provided by an electric motor for changing the position of the magnets and thereby reversing the polarity of the magnetic fields used for generating the flow related signal. Several types of motors including DC brush and brushless, AC induction and stepper motors may be used. Stepper motors have the advantages of being brushless, not requiring continuous power and providing rotational steps which can be used to advantage in repositioning the magnets in a single step. The flow sensor 500 shown in FIG. 21 illustrates the principal elements of a flow sensor incorporating a stepper motor.

Referring to FIGS. 21 and 22, the flow sensor 500 includes four electromagnets 506a–506d with arc shapes at the end of their cores, four small disc permanent magnets 507a–507d and electrically conductive magnetic epoxy (FIG. 24). The electromagnets 506 have their windings connected to provide alternating flux polarities at the arc shaped ends of their cores as in FIG. 22. These magnets 506 are energized at the same time with electrical pulses of alternating polarity so that their flux polarities reverse periodically. The flux pulsation from each electromagnet 506 is of the same polarity as that of the nearest small disc magnet 507 located on the upper disc 504 as shown in FIG. 23 so that a repulsion force between the two occurs causing a 90° disc rotation.

The small disc magnets 507 have a small angular offset with respect to the electromagnets 506 and the large disc magnets 510a–510d (FIG. 25) used for the flow related measurement. Since the small disc magnets 507 would normally be attracted to and come to rest at the center of the arcs following each pulse, the large disc magnets 510 would then be offset from the optimum position directly over the flow passage 512a and 512b. The arrow 23 in FIG. 23 shows the direction of the resultant disc offset. However, the electrodes 514a and 514b shown in FIG. 24 are bonded to their connecting wires with an adhesive having magnetic properties which is offset angularly opposite to that of the small disc magnets 507 so as to attract the large disc magnets 510 in the opposite direction as shown in FIG. 25 and align them properly. A nickel filled epoxy has been found to be effective in providing both the electrically conductive and magnetic properties. Other materials for providing the desired magnetic and/or electrically conducted properties. Other materials for providing in particular the desired magnetic properties such as small magnets or pieces of iron may be located at or near the electrodes or elsewhere to provide the same angular offset.

The angular offset introduced between the center of the arcs and the small disc magnets determines the stationary or starting position prior to each pulse and, as such, the direction of rotation. Without such an offset, rotation could occur in either direction or if the disc assembly 504 were exactly centered from the last pulse, or possibly not at all.

When rotation does occur, there is typically a damped oscillatory action as the disc assemblies overshoot the 90° position and return past that position, perhaps several times, before becoming stationary. If the number of oscillatory cycles varies and/or the stationary locations of the disc assemblies 504 and 508 are not consistent, an intolerable flow measurement error relating to the nature of detecting the average amplitude of the flow related signal can be introduced. One possible way of eliminating this error is to detect the amplitude peaks of the signal with a "sample-and-hold" circuit while it oscillates around its central position.

FIG. 26 illustrates an example of an electronic circuit approach intended for use with a stepper motor. A signal amplifier 580 is comprised of two electrode amplifiers 516a and 516b and differential amplifier 582. The signal amplifier 580 forms an instrumentation amplifier which amplifies the alternating electrode signals and applies their difference signal to a buffer 584 and then to a tracking detector circuit 586. The tracking detector signal output enters a signal processor 588 for analog-to-digital conversion and digital processing.

A clock oscillator 590 with additional circuits provides the stepper motor excitation, timing and switching functions to power the motor 502 (not shown) and to effectively turn off the amplifier 580 and detector 586 circuits during the generation of high electrical noise which occurs during and for a short time after a stepper motor pulse. This allows enough time for the amplifier 580 and detector 586 circuits to recover and accurately provide a flow related signal for processing, and to reduce their power duty cycle for overall power reduction. The functional equivalent of these circuits can be part of the signal processor 588, particularly if it is microprocessor based.

Of note is that the amplified signal also enters a low pass filter prior to entering the buffer 584, which provides essentially a DC correction signal back to the electrode amplifier 516a. This form of negative feedback biases the operating point of the amplifier 516 as to shift the DC operating point of the final signal from amplifier 582 much closer to ground than it might otherwise be due to galvanic action at the electrodes or amplifier offset.

The feedback circuit enables the electrode signals to be amplified and detected without the use of decoupling capacitors, which is an advantage in reducing the circuit recovery time after a motor pulse or signal noise occurs. The capacitor 583 which makes up part of a sample and hold circuit 584a is switched out of the circuit until the circuit recovers from the motor pulse. Also of note is that the tracking detector 586 has as its negative supply/reference the buffered version of the same signal applied to its input. With the exception of the buffered signal being a DC level signal while the input signal has the same DC level but with an added AC component having a magnitude representing flow rate, the two signals track each other so that detection of the AC component can be performed precisely over a very wide dynamic range. A tracking detector 586, also not incorporating any capacitors and other circuits, can be disabled during the motor pulse and can likewise recover quickly. The detector 586 is of the active full wave type and can easily be enabled for signal detection by applying operating power. A wide range of detector types such as peak detectors which detect and hold the maximum magnitude of the amplified electrode signals as well as synchronous detectors which detect the signal magnitude with reference to internal or external timing signals or a certain mechanical orientation of the magnets with the flow passages are also applicable. When phase referenced to magnet orientation with the flow passages, the detected signals may also be used to indicate flow direction.

The clock oscillator 590 would normally operate at a low frequency, for example, one Hz. At that frequency, two pulses would typically be applied to the stepper motor in one second to rotate the flow sensing discs 504 and 508 90° and then 180°. In the course of that second, the voltage decay of the sample and hold circuit would be low enough to prevent any significant flow related error. However, when flow is not present and a delay in responding to the start of flow is permissible, a much lower clock oscillator frequency may be used to advantage, which will drastically reduce power consumption and overall wear and tear. The clock oscillator circuit 590 can therefore have a provision, for example by increasing the time constant of its timing circuit, for changing its frequency as a function of magnitude of the flow related signal.

The signal processor can be programmed so that flow rates under a certain value are considered to be zero, whereby the clock oscillator 590 is automatically switched into the low frequency mode. When the flow rate increases beyond that value, normal operation commences.

When motors are used in such a way that they do not generate significant amounts of electrical noise, it is not necessary to periodically disable the electrode signal amplification and processing functions. The electronic circuit may then be simplified while still taking advantage of the stabilizing functions of the amplifier feedback and the tracking detector. The switching of the sample and hold circuit 584a may be eliminated so that the circuit functions as a buffered low pass filter with a long time constant relative to that of the signal frequencies. However, motor stoppage for load shedding must have the provisions for aligning the magnets used for flow sensing well enough over the flow passages for the flow detection functions to operate reliably.

Of significant commercial value is that a flow meter based upon the various embodiments of the present invention and using permanent magnets can be easily made to detect when the flow is increased significantly from zero, and to do so while consuming very little power. With the use of very high input resistance amplifiers, small increases in flow rate from zero can even be detected when the flow related flux polarity is not reversed for a long time (i.e., minutes, hours and possibly even days, or at all). While the instability of such signals prohibits their use for measurement applications, they can serve as detectors of flow rate change and uniquely so for the present invention as the permanent magnets enable such detection to be accomplished with very little power.

FIG. 21 illustrated an arc shape of the electromagnetic poles 506 for the stepper motor of the present invention. If the arcs are relatively narrow, and may even be shaped differently such as circular to concentrate the magnetic flux over a relatively narrow area, the small disc permanent magnets 507 will be attracted to align themselves with the pole centers. However, if the pole arcs are relatively wide so that their angular span approaches the spacing of two adjacent motor magnets as shown in the Figure, the dominant attraction will be for those magnets to align themselves with the pole edges, a shift of 45° for the example shown. Either configuration will enable a stepped rotation to be produced and can, with proper orientation, be used with the present invention.

FIG. 13 previously described herein illustrated the use of electromagnets acting directly upon the flow detecting permanent magnets on the rotating discs 204 and 208 and not over the flow passages so as to cause disc rotation. FIGS. 27 and 28 are center section views of the critical elements of an applicable flow sensor from the front and side respectively, whereas FIG. 29 is a sectional view at the center of the flow passages. A single electromagnet 606 with a small magnetic core is used in this example to present less restriction to the flow. The magnet 606 is angularly offset to bias the rotation of disc 604 to a stationary position slightly off center for maximum flow generated signal while small amounts of magnetic materials or small magnets are located offset at the electrodes 614 for example, to exert the opposite bias force and to ultimately center the discs 604 and 608. The arrows in FIG. 29 show the direction of the bias forces on the discs 604 and 608.

When the electromagnet 606 is pulsed alternating current pulses, its magnetic repulsive force is relatively large, dominating the bias forces and causing the discs 604, 608 to rotate. Since the electromagnet 606 center was offset from that of the disc magnets because of the bias forces, the magnetic repulsion force always produces a force component which causes the discs 604 and 608 to tend to rotate in the same direction.

In FIGS. 30-35, rotation of the discs 604, 608 is caused by mechanical movement of a small permanent magnet 607 located close to one or both discs 604, 608. In FIG. 30, a small permanent magnet 607 is made to slide or pivot about the intermediate distance between the magnets mounted on the discs 604, 608. Since the intermediate distance represents magnetic null due to the opposing polarities of the disc magnets 606, 610, a small departure from that position produces a substantial increase in flux (of either polarity) which interacts with the small magnet 607 causing corresponding attractive and repulsive forces.

Initially, where the small magnet 607 is attracted to and relatively close to a disc magnet 606, 610, the small magnet is mechanically moved closer to the aligned disc magnet of the opposite polarity which tends to repel it. This repelling force between the two magnets provides the rotational force component and the tendency to produce rotation. This action is then reversed to produce disc movement in the opposite direction, and so forth.

Various means may be incorporated to move the small magnet 607. For example, it may be acted on by an electromagnet and a return spring, or by two electromagnets in a balanced configuration. Of note is that with the disc magnets 606, 610 shown, a total of 90° (+/−45°) of rotation is normally used and that this type of oscillatory movement, especially if operated continuously at the natural resonant frequency of the discs and spring or other returning force, will require relatively low electrical power.

With a continuing oscillatory type of disc movement, it is desirable for the rotation to be a little greater than +/−45° so that the flow passages 612 are exposed to the maximum flux and therefore generate the maximum possible signal of each cycle. A peak detecting type of signal detector will then provide a stable flow sensor calibration even though the rotational angle may vary somewhat. The small amount of rotation overshoot may be produced by increasing pulse power.

An inductor similar to the electromagnets illustrated in FIGS. 13, 28 and 29 will provide a generated signal indicative of rotational rate and direction. This signal can be amplified and used to power the means for moving the small magnet 607 so that oscillations will start and be maintained at the resonant frequency. A free running pulse generator would initially start the oscillation.

While some form of magnetic biasing may be incorporated into the present invention to assure rotation, such assurance may also be had by imparting a slanting angular offset to the small magnet movement path with respect to that of the disc rotational axis while allowing for some mechanical flexibility of the magnet or its support. Since the repulsion force that the magnet would normally experience would tend to deflect it from its central axis, a force component tending to produce rotation will always occur.

If the small magnet 607 is relocated to be closer to one disc than the other and rotated by external means such as a motor, it will cause the discs 604, 608 to rotate. The rotation can be continuous in one direction and rotation is assured without magnetic bias, mechanical offsets, etc. Of note is that the small magnet 607 can be, as an example, very small (0.125 inch diameter by 0.060 inch long) compared to the eight disc magnets (0.250 inch diameter by 0.200 inch long) and one or two discs 604, 608 (0.700 inch diameter by 0.100 inch long) that it is able to rotate, it is also possible to orient the small magnet 607 in its rotational axis at a right angle to the disc axis.

In FIGS. 32 and 33, the rotation of a small magnet close to the disc sensing magnets can cause the flow sensing disc to rotate. FIGS. 34a–34c illustrate additional embodiments for magnetically coupling for disc rotation and have similar features except that, as will be noted, coupling can of course be made using conventional methods such as friction drives, belts and gears. Although the dual disc arrangement is the preferred embodiment, single disc operation is also possible.

In FIG. 34a, the motor rotational axis is at a right angle to that of the flow disc axes. Since the friction losses are typically very low, it is practical for the magnets on the disc drive to be small compared to the flow sensing magnets and the distance between them to be relatively large. This allows the motor 702 and the drive disc 703 to be conveniently located without inhibiting the flow passages.

In an example of the preferred embodiments shown in FIG. 34a, the flow sensing discs 704, 708 each have four magnets 706, 710 of alternating polarity while the disc drive 703 has two magnets 703a, 703b of alternating polarity. The magnets of both discs align with respect to each other to be mutually attractive. With this configuration, the flow sensing discs 704, 708 will make one revolution for every two revolutions of the drive disc 703. By changing the ratio of the number of magnets on the drive and sensing discs, different sensing discs speeds can be obtained in a manner like that of mechanical gear trains to suit a variety of requirements.

The drive magnets 703a 703b act primarily on a single flow sensing magnet at a time when it is not located over a flow passage and in line with the electrodes (such as electrodes 114 in FIG. 9), and therefore has very little affect on the performance of the flow sensor 700. FIG. 34b illustrates an in-line axial magnetic coupling between the drive and a sensing disc 708, where the sensing disc 708 has additional magnets 709 on top for coupling to the drive magnets 703. However, if they are not in line but the motor axis is offset to the side or to a right angle as in FIG. 34a, for example, a different number of drive magnets on the two discs will change their speed ratio. If the motor driven disc 703 has two magnets and the sensing disc 708 has 20 magnets, a speed reduction of 10:1 will result. In some applications, this will eliminate the need for a motor gear box.

FIG. 34c has its motor offset at an intermediate angle (i.e. roughly around 45°). This is useful, for example, where the flow sensing probe is used at an angle in trash-loaded streams and it is desired that the flowing debris automatically clear the sensor by easily washing itself free of the probe.

FIGS. 35a and 35b illustrate a preferred embodiment of a flow sensor 800 in which the flow passages including the electrodes are easily removed and replaced as a module. Typical applications can be found in the laboratory/medical/pharmaceutical/industrial areas utilizing small tube/pipe sizes. FIG. 35a is a central cross section of the major components of such a sensor from the side while FIG. 35b is a central cross section of the replaceable flow tube module from the top.

The multiple flow tube (dual flow tube as shown in FIG. 35a) rectangular configuration is the preferred embodiment although a single round tube is also usable. It maximizes the cross sectional area between the magnets of the upper and lower discs for minimum flow pressure drop while minimizing the magnet-to-magnet distance across the liquid for maximum magnetic flux and therefore maximum generated signal. The flow tube assembly 813 can typically be a relatively low cost module which slides from left to right into the sensor housing. Both the housing and module are precision made and keyed so that the fit between the module and the housing is a precision fit which is precise even when replacement modules are used. Spring terminal connections 815 automatically provide the electrical connections to the module electrodes when the cover 817 is closed. By maintaining close manufacturing control of the flow tube module 813 in particular, module 813 can be replaced without recalibration and, alternatively/additionally, each module can be individually calibrated against a factory standard, for example, and an additional calibration noted for meter correction at the time of installation.

Incorporating the provisions for a replaceable flow tube module to a certain extent opens the sensor to environmental factors such as electrical noise which can seriously degrade its performance. Since the preferred embodiments using dual discs cost effectively produces a sufficiently large signal and is relatively insensitive to interfering electrical noise compared to other magnetic flow sensors, a replaceable flow tube module is practical. A single disc sensor of inferior but possibly acceptable performance for some applications is also practical.

The flow tube module 813 would typically have its flow passages manifolded so that the user has a single inlet and outlet and a single outlet passage to join to. However, some applications require coexistent multiple metering where it would be desirable to separately measure the flow rates. Such an example is the industrial use of a two-component spray paint where the quantity and the mix ratio of both components need to be monitored. The sensor in this case would have a solid common electrode connected between the flow passages to prevent mixing of the liquids. This would be wired to an additional spring terminal connection at the bottom of the module which, in conjunction with two-channel signal amplifier and electronic processing, will provide the desired flow rates and ratio data when separately sensed and signal processed flow are flowing through the flow tubes. In this instance the flow should be in the direction opposite to that of flux movement rate through the passage to avoid the ambiguity of the signal becoming zero when a significant flow rate is present. The respective flow signals may be used for balance and control with relation to each other. For example, when the electrode signals are summed and the flow direction is such as to provide signal cancellation, a precise and stable signal null is obtained over a very wide range of flows when they are precisely equal. Differential measurements over a wide range of ratios are similarly precise as the same flux field uniquely engages both flow passages.

In the preferred embodiment the flow tube module of FIGS. 36A and 36B can also be inserted and removed from the bottom of the housing. Both outer electrode contacts could then be mounted on a rigid part of the housing 813. The neutral electrode, if required, may be conveniently located along either or on both tubes outside of the magnetic field environment.

When accessed from the bottom, the lower disc, on its own bearing system and being only magnetically coupled to the upper disc can, as a removable modular part of the sensor, be held in its operational position by the magnetic attraction between it and the upper disc so that the flow tube module is squeezed between the two. Different size flow tube modules covering a range of thickness and widths and therefore a range of flow rates can then be used by the same housing 813 with the distance between the discs being regulated by the module dimensions for maximum sensitivity, specific calibrations or other factors. The spacing between the discs can also be adjusted to the application by mechanical means. This is particularly applicable to soft tube flow passages like blood vessels. Since the vessel walls are usually thin and electrically conductive, the electrodes need only contact the outside of the wall thereby making the measurement non-invasive.

It is also practical to provide the flow sensing assembly without the flow tube module 813 as a portable meter, whereby it is moved from location to location where a flow tube module or fitting already mounting the electrodes, and even the magnet assembly, will have already been installed so that an occasional measurement can be made. This can also be made to work with large pipes as might be used for agricultural irrigation, for example, using the single disc configuration with the acceptance of some performance degradation. When used with electrically insulating pipes such as PVC pipe, it is necessary only to accurately locate two small electrodes directly in the pipe and then wire to and mount the rest of the meter over them to make the measurement.

FIGS. 35a and 35b and the description relating thereto describe multiple flow tube portions of the present invention using a single disc or preferably a coaxially aligned pair of discs. Another way of configuring such a sensor is to use separate discs or disc pairs for each flow tube whereby the discs are magnetically coupled so that all of them can be rotated by a single motor. Magnets already being used for the flow sensing function can provide the magnetic coupling or, alternatively, additional magnets may be added for coupling. The use of a single motor offers the advantages of smaller size, lower power consumption and reduced costs. A simplified view of such an arrangement is shown in FIG. 36a.

Both the single disc and, to a lesser extent, the dual disc versions of the sensor 900 provide sufficient magnetic flux outside of the signal generating environment to be used for the mechanical drive as illustrated. The mechanical force required for rotation is very small and due entirely to mechanical unbalance and bearing friction. The distance between the adjacent sensors can be substantial, thereby permitting either the same or separate electrodes 914 to be used. Adjacent magnet separation as large as one half the disc diameter of dual disc sensors using neodymium magnets as shown approximately to scale in FIG. 36a is practical.

With further reference to FIGS. 34a–34c, during start up rotation, acceleration must be slow enough for the drive and slave discs 704 and 708, respectively, to maintain their magnetic synchronization. If synchronization is lost, the slave discs 708 will remain stationary even though the drive discs 704 may be operating at full speed. This matter only becomes a problem when each drive disc 704 is operated at a relatively high speed as may be required for responding quickly to rapid flow changes. A detector may then be required to determine the presence of rotation and, if it is not present, stop and then restart the drive disc. Such a detector may be an inductive pickup made from a coil of copper wire located to detect the alternating flux from a rotating slave magnet. Other types such as hall effect and photoelectric are also applicable.

FIG. 36b similarly illustrates a sensor 1000 configured with magnetically coupled discs but surrounding a single flow passage 1012. Note that the magnetic flux fields in the immediate vicinity of the discs which are used to produce the flow related signals are much stronger than the relatively weak fields needed to mechanically couple the discs. Single discs 1004 are shown although dual discs and probe type sensors may also be used. The use of multiple sensing locations enables substantially improved measurement precision to be achieved over that of a single sensing location as in a typical flow probe.

While common use of the single electrodes 1014 between the discs as shown in FIG. 36b appears to be the most efficient utilization of resources, a separate pair of electrodes 1014 for each disc may be preferable, particularly when minimum electrode signal shunting is desired and with minimum attenuation from fluid shunting effects or opposite polarity signals generated nearby. Any number of the discs or their orientations or combinations may be used in single plane or curved or circular configurations as applicable to the application so that the electrodes 1014 sense the greatest generated signal from their respective discs. Each disc related pair of electrodes 1014 provides signals to a separate channel of amplification, detection and processing after which they are combined to reflect the total flow.

For measuring extremely low flow rates, a sensor can be designed with very small flow passage dimensions while otherwise maximizing magnetic flux and the flow generating distance between the electrodes. There are practical limits to this approach and further gains may be made by adding separate sensors in which the same flow passes through the sensors in series while the electrode signals, correctly phased, are additive. This approach is practical with the various embodiments of the present invention because of its low inherent cost and because several such sensors can be conveniently grouped into one physical sensor and operated by a single motor. FIG. 36a illustrates a method of grouping such sensors.

An alternative approach to the above is illustrated in FIG. 37. This embodiment 1100 uses additional small magnets to 1103 to rotationally couple the discs 1104 because the polarity of the disc magnets opposes the natural alignment of the discs 1104 with respect to each other. This rotational coupling method is quite practical with the dual disc configuration because there is a relatively small amount of flux from the disc magnets 1106 and 1110 which would interfere with the drive operation.

The alignment of the discs 1104, however, enables the same polarity of flux to penetrate the flow passages with flows in the same direction. Common electrodes 1114 may be conveniently used, whereby the generated signals from all of the flow passages 1112 are additive and disc rotation induced signals are self-cancelling. Where they may not be self cancelling because of any combination of flow direction, electrode usage or magnetic polarity or direction of movement as in other embodiments of this invention, an offset signal will be produced which needs to be accommodated or canceled. The offset signal is significantly reduced, if not entirely eliminated, if electrode signal detection occurs when the magnets are stationary as, for example, when stepper motors are used.

Referring now to FIGS. 38a and 38b, a magnetic flow sensor 1200 in accordance with another alternative preferred embodiment of the present invention is disclosed. With the flow sensor 1200, the rotating magnets are wetted by the fluid being measured. Both single and dual discs and probe arrangements can be made this way. The spaces between the magnets 1206 and 1210 on a magnetic disc can be filled with an inert material to form a smooth cylinder, the entire assembly then being overcoated with a protective coating such as a fluoroplastic (e.g., PTFE) to withstand the fluids' corrosive and/or abrasive effects.

Small coupling magnets 1207 are used to couple the output of the drive motor shaft 1230 to the magnetic assembly. This avoids the need for a shaft seal. The spaces between these magnets 1207 are also preferably filled with an inert material and overcoated as part of the magnetic assembly. When enclosed, the spacing of the magnetic assembly to its housing is preferably small with respect to the areas of the flow passages to facilitate most of the fluid passing through those passages.

The major advantage of this configuration is that the spacing between the magnets 1206 and 1210 can be made much smaller for the same thickness of the flow passage thereby resulting in greater magnetic flux and greater signal output. Furthermore, the fluid differential pressure is imposed on the member separating the drive magnets which can now be made relatively thick to allow for higher pressure and/or temperature operation with relative ease.

Finally, there are applications where the ability to sense low flow rates is very important. An example would be a domestic water meter where the range of measurement may vary between a trickle of a tiny stream or over ten gallons per minute. The magnetic flow sensor of the preferred embodiments described herein, and particularly the two disc embodiment described herein, can be easily modified to increase its low flow sensitivity by a factor of two without resorting to reducing the dimensions of the flow channels. This is achieved by routing all of the flow of the fluid through series connected channels rather than through all of the channels at the same time in parallel. FIG. 35b may be used to illustrate the above principal. In the case where the discs are rotated continuously, the flow through both channels must be in the same direction to cancel the rotation induced electrode voltages. The connection between the channels can be internal or external to the device. If the discs 804 and 808 are angularly stepped and then remain stationary during the time when the electrode voltages are being measured, the flow direction is of no factor.

It should also be appreciated that the use of multiple magnets can be broadened to include single magnets with multiple pole faces or single magnets attached to one or more magnetic parts which have multiple pole faces. This is particularly applicable to the magnetic couplings used in the motor drives described herein.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

I claim:

1. A flow sensor for measuring a rate of flow of an electrically conductive liquid, the sensor comprising:
   an electrically insulated flow passage;
   a permanent magnet providing magnetic flux orthogonal to the liquid flow;
   a pair of electrodes disposed opposite the passage and contacting the liquid, the electrodes being in line with and orthogonal to the flow passage and generally parallel to the magnetic flux, such that said flow passage forms a generally linear fluid flow path; and
   a mechanical drive for periodically repositioning the magnet to alternate the magnetic flux polarity to produce an alternating voltage at the electrodes having a magnitude proportional to a flow rate of the liquid.

2. The flow sensor as in claim 1 wherein the mechanical drive for repositioning the magnets includes an electric motor.

3. The flow sensor as in claim 2 where the permanent magnet has at least two poles and is rotated in a plane parallel to the liquid flow in the flow passage.

4. The flow sensor as in claim 1 wherein the mechanical drive for repositioning the magnets comprises an electric motor, and the permanent magnet is fixed to a rotating element of the motor and is acted upon electromagnetically to produce the rotation.

5. A flow sensor as in claim 4 where the permanent magnet has at least two poles and is rotated in a plane parallel to the liquid flow in the flow passage.

6. The flow sensor as in claim 1 further comprising a second magnet disposed opposite the flow passage from the first magnet so that mutual magnetic attraction exists between the first and second magnets to effect synchronous rotation.

7. The flow sensor as in claim 6 where the permanent magnet has at least two poles and is rotated in a plane parallel to the liquid flow in the flow passage.

8. The flow sensor as in claim 6 further comprising:

magnet pairs having at least 4 poles of alternating polarity;

a plurality of parallel adjacent flow passages; and a third electrode, the third electrode forming a common element between the two adjacent passages to provide an addition of the alternating voltage signal provided by each one of the pair of electrodes.

9. The flow sensor as in claim 8 further comprising a plurality of flow sensors, coaxially aligned such that the motor driven magnet magnetically attracts and rotates the magnet on the opposite side of its flow passages, the magnetically coupled magnet being mechanically attached to the mechanically driven magnet of a second flow sensor which magnetically attracts and rotates the magnet on the opposite side of its flow passage so that signals from each of the sensors contribute to the overall flow measurement.

10. A flow sensor for measuring a flow rate of an electrically conductive liquid, the sensor comprising:

an electrically insulated flow passage;

an electromagnet having a plurality of adjacent poles of opposite polarity and positioned orthogonally with respect to the flow passage; and a pair of electrodes located on opposite sides of the flow passage and positioned in line with and orthogonal to the magnetic flux such that the flow passage forms a generally linear fluid flow path, the electrodes producing an alternating voltage with a magnitude proportional to a flow rate of the liquid.

11. The flow meter as in claim 10 where magnetic material is placed on the side of the flow passages opposite the electromagnet to reduce the magnetic circuit reluctance thereby increasing the magnetic flux and the output signal from the electrodes.

12. A flow sensor for measuring the flow rate of an electrically conductive liquid, comprising:

a plurality of electrically insulated adjacent flow passages;

an electromagnet having a plurality of adjacent poles of opposite polarity and providing substantially the same polarity and magnetic flux orthogonal to the liquid flow in both passages;

three electrodes in contact with the liquid, first and second ones of the electrodes being located on the outsides of the flow passages in line with and orthogonal to said magnetic flux, the third electrode being common to the flow passages to effect an addition of voltages from the first and second electrodes which alternate at the frequency of the electromagnetic electrical excitation and with a magnitude proportional to the flow rate of said liquid.

13. The flow sensor as in claim 1, further comprising:

a second permanent magnet aligned with the permanent magnet to form a pair of permanent magnets and being disposed on opposite sides of the flow path such that the pair of permanent magnets are magnetically attracted to one another; and the pair of permanent magnets being coupled to the mechanical drive so as to be mechanically rotatable by the mechanical drive in unison with each other.

* * * * *

UNITED STATES PATENT AND TRADEMARK OFFICE
CERTIFICATE OF CORRECTION

PATENT NO. : 5,691,484

DATED : November 25, 1997

INVENTOR(S) : Feller

It is certified that error appears in the above-identified patent and that said Letters Patent is hereby corrected as shown below:

| | |
|---|---|
| Col. 3, line 15 | delete "and". |
| Col. 3, line 17 | "A-A." should be --A-A;--. |
| Col. 8, line 48 | "ND" should be --A/D--. |
| Col. 10, line 35 | "shod" should be --short--. |
| Col. 10, line 54 | "shod" should be --short--. |
| Col. 11, line 65 | "some times" should be --sometimes--. |
| Col. 14, lines 22-23 | delete "Other materials for providing the desired magnetic and/or electrically conducted properties." |
| Col. 16, line 16 | "illustrated" should be --illustrates--. |
| Col. 18, line 13 | "magnets 703a703b" should be --magnets 703a, 703b--. |
| Col. 19, line 37 | "FIGS. 36A AND 36B" should be --FIGS. 36a and 36b--. |

UNITED STATES PATENT AND TRADEMARK OFFICE
CERTIFICATE OF CORRECTION

PATENT NO. : 5,691,484

DATED : November 25, 1997

INVENTOR(S) : Feller

It is certified that error appears in the above-identified patent and that said Letters Patent is hereby corrected as shown below:

Col. 21, line 20        delete "to"

Col. 22, line 16        "principal" should be --principle--.

Signed and Sealed this

Thirty-first Day of March, 1998

*Attest:*

BRUCE LEHMAN

*Attesting Officer*     Commissioner of Patents and Trademarks